(12) United States Patent
Singh et al.

(10) Patent No.: US 7,383,233 B1
(45) Date of Patent: Jun. 3, 2008

(54) METHOD OF DESIGNING AN ELECTRONIC TRANSACTION SYSTEM

(75) Inventors: Vikram Singh, Singapore (SG); Lisa McClung, Chicago, IL (US); Gilbert C. L. Leong, Singapore (SG); Karl-Heinz Hetfleisch-Wenzel, Walluf (DE)

(73) Assignee: General Electric Company, Schenectady, NY (US)

( * ) Notice: Subject to any disclaimer, the term of this patent is extended or adjusted under 35 U.S.C. 154(b) by 1546 days.

(21) Appl. No.: 09/710,543

(22) Filed: Nov. 9, 2000

Related U.S. Application Data

(60) Provisional application No. 60/168,893, filed on Dec. 3, 1999.

(51) Int. Cl.
*H04K 1/00* (2006.01)
(52) U.S. Cl. .......................................... 705/80; 705/10
(58) Field of Classification Search .................. 705/10, 705/26, 1, 80
See application file for complete search history.

(56) References Cited

U.S. PATENT DOCUMENTS

| | | | | |
|---|---|---|---|---|
| 4,845,347 A | | 7/1989 | McCrindle et al. | |
| 4,899,036 A | | 2/1990 | McCrindle et al. | |
| 5,257,185 A | * | 10/1993 | Farley et al. | 707/100 |
| 5,745,654 A | * | 4/1998 | Titan | 706/20 |
| 5,799,285 A | * | 8/1998 | Klingman | 705/26 |
| 5,826,240 A | * | 10/1998 | Brockman et al. | 705/11 |
| 5,852,811 A | * | 12/1998 | Atkins | 705/36 |
| 5,884,274 A | * | 3/1999 | Walker et al. | 705/4 |
| 5,930,764 A | * | 7/1999 | Melchione et al. | 705/10 |
| 5,953,707 A | * | 9/1999 | Huang et al. | 705/10 |
| 5,963,967 A | * | 10/1999 | Umen et al. | 715/513 |
| 5,968,175 A | * | 10/1999 | Morishita et al. | 726/28 |
| 5,970,479 A | * | 10/1999 | Shepherd | 705/37 |
| 6,029,144 A | * | 2/2000 | Barrett et al. | 705/30 |
| 6,041,304 A | * | 3/2000 | Meyer et al. | 705/4 |
| 6,064,982 A | * | 5/2000 | Puri | 705/27 |
| 6,091,835 A | * | 7/2000 | Smithies et al. | 382/115 |
| 6,108,635 A | * | 8/2000 | Herren et al. | 705/2 |
| 6,216,115 B1 | * | 4/2001 | Barrameda et al. | 705/40 |

(Continued)

OTHER PUBLICATIONS

Ilene Knable Gotts, "The "innovation market": Competitive fact or regulatory fantasy?", Practical Lawyer, Philadelphia, Jan. 1998, vol. 44, Iss. 1, p. 79, 9 (nine) pgs. (6 page printout).*

*Primary Examiner*—Andrew Joseph Rudy
(74) *Attorney, Agent, or Firm*—Ziolkowski Patent Solutions Group, SC

(57) ABSTRACT

A method for designing an electronic transactions system and forming a proposal for doing business on a global communications network is disclosed. The invention includes reviewing existing direct sales screening processes, creating new processes, integrating new and existing screening processes, determining and implementing legal terms and conditions for electronic transactions and forming electronic media for posting. Additional steps may include identifying possible transactions based on available products and services, approaching subject matter experts to obtain data, preparing electronic templates and filter mechanisms, and presentation of proposed methods. Steps dealing with legal issues include incorporating terms and conditions of sales through the site, preparing agreements for financial institutions to govern electronic payments, and developing exclusion clauses for traditional third party contracts. Key project personnel create content for an interactive site on a global communications network. A system for filtering and collecting payments electronically may also be implemented.

29 Claims, 15 Drawing Sheets

U.S. PATENT DOCUMENTS

| | | | |
|---|---|---|---|
| 6,219,674 B1 * | 4/2001 | Classen | 707/104.1 |
| 6,236,955 B1 * | 5/2001 | Summers | 703/6 |
| 6,321,217 B1 * | 11/2001 | Maeda et al. | 706/47 |
| 6,408,282 B1 * | 6/2002 | Buist | 705/37 |
| 6,427,140 B1 * | 7/2002 | Ginter et al. | 705/80 |
| 6,532,586 B1 * | 3/2003 | Negoro | 717/105 |
| 6,539,403 B2 * | 3/2003 | Cho et al. | 707/203 |
| 6,564,121 B1 * | 5/2003 | Wallace et al. | 700/231 |
| 6,571,219 B1 * | 5/2003 | Spivey | 705/36 |
| 6,584,472 B2 * | 6/2003 | Classen | 707/104.1 |
| 6,662,355 B1 * | 12/2003 | Caswell et al. | 717/103 |
| 6,871,140 B1 * | 3/2005 | Florance et al. | 701/207 |
| 6,912,502 B1 * | 6/2005 | Buddle et al. | 705/1 |
| 6,925,443 B1 * | 8/2005 | Baggett et al. | 705/10 |
| 6,954,734 B1 * | 10/2005 | Kuelbs et al. | 705/26 |
| 7,027,992 B2 * | 4/2006 | Zaccaria et al. | 705/4 |
| 7,133,834 B1 * | 11/2006 | Abelow | 705/10 |
| 7,149,724 B1 * | 12/2006 | Flanagan et al. | 705/80 |
| 7,162,458 B1 * | 1/2007 | Flanagan et al. | 705/80 |
| 7,194,442 B1 * | 3/2007 | Flanagan et al. | 705/80 |
| 7,222,109 B1 * | 5/2007 | Flanagan et al. | 705/80 |

* cited by examiner

METHOD OF DESIGNING AN ELECTRONIC TRANSACTION SYSTEM

CROSS-REFERENCE TO RELATED APPLICATION

This application claims the benefit of prior U.S. Provisional Application Ser. No. 60/168,893 filed Dec. 3, 1999 and entitled TOOL KIT FOR DEVELOPING AN INTERNET-BASED RESTRICTED TRANSACTION SYSTEM

BACKGROUND OF THE INVENTION

The present invention relates generally to a method and system of doing business, and more specifically, to a method and system of designing a standardized process for electronic transactions in a large organization of diverse operations.

Electronic commerce (e-commerce) conducted over a global communications network, e.g. the Internet, offers a whole host of opportunities to market and sell products on a worldwide basis. One of the main benefits of e-commerce is that it can be done at a fraction of the cost normally associated with traditional transactions. Further, e-commerce sites can be "open" 24 hours a day to serve customers throughout the world regardless of differing time zones.

However, this brave new world is fraught with uncertainties and risks. As business managers and organizations rush to provide products and services over the Internet, there are many pitfalls which must be guarded against. One such pitfall is the unknown customer—the customer who ultimately ends up being the end user/third party purchaser. For example, it is desirable for legitimate companies to avoid doing business with customers that may have connections to money laundering operations or those with bad credit. Further, in many areas of commerce, there are regulatory issues which must be addressed in order to minimize legal risk to the selling organization. For example, when selling medical related technology, the United States Food and Drug Administration (FDA) and other organizations, such as the State Department, have various regulations which severely limit commercial transactions both in the United States and abroad. These issues and others need to be addressed immediately before the organization exposes itself to some unforeseen liability by doing business over the Internet. Such problems are exaggerated with large organizations that have diverse operations.

It would therefore be desirable to have a set of process steps defined to implement electronic transaction systems consistently in organizations with diverse operations.

SUMMARY OF THE INVENTION

The present invention provides a method of designing an electronic transaction system that solves the aforementioned problems. One solution to the above problems is to streamline procedures and establish company-wide guidelines so that all of an organization's business components will have consistent e-commerce practices. This will reduce variation in all e-commerce transactions and thus, minimizes the risk of legal/compliance liability. Such procedures will also help all involved parties clearly define the scope of the transaction from the beginning, and therefore, reduce transaction time and increase revenues. The preferred process will bring together subject matter experts to develop document templates, filter mechanisms, and other necessary procedures and systems to efficiently and effectively process global electronic transactions across an entire organization's operations. The preferred process will also help reduce cycle time for registering new customers and promote customer awareness of legal and regulatory requirements. As customer awareness of the requirements increases, the entire transactional timeline should be streamlined and shortened for all involved.

The invention includes reviewing existing direct sales screening processes to ensure current policy compliance, creating new screening processes to minimize commercial risk in an electronic transaction, integrating the existing direct sales screening processes and new screening processes, determining legal terms and conditions for the electronic transactions, forming electronic media for these steps, and posting the electronic media on a global communications network for access by each member of any e-commerce team for all business units and modalities within an organization.

Development of the inventive method may begin by preparing a high-level process map, considering the impact of the high-level process map, preparing electronic red flag checklists which follow the high-level process map, contacting key personnel to answer queries, contacting key personnel to provide background data, approving site design and site contents prior to release, constructing the site, and releasing the site for use by potential customers over a global communications network.

In another aspect of the invention, a proposal for doing business on a global communications network includes determining available products/services, identifying types of possible transactions based on the available products/services, approaching a subject matter expert for a business modality to obtain subject matter data, and preparing an electronic document template for each specific transaction to reduce transaction variation. The process also includes creating a global communications network filter mechanism to minimize legal/regulatory risks, and presenting a proposal based on the previous steps to a head of the business modality for approval.

In still another aspect of the invention, a method of doing electronic commerce over a global network includes proposing an interactive global communications network site, preparing a list of product and service offerings to be made available through the interactive site, and creating content for the interactive site. The process also includes defining legal issues and legal issue impact before and after site rollout, a financial institution to govern electronic payment for a product or service sold through the interactive site. Electronic commerce exclusion clauses are also developed for inclusion into traditional third party contracts, the interactive site is then approved as ready for commerce, and the interactive site is posted on a global network for use by potential customers.

In yet another aspect of the invention, the inventive method may further include 1) before the posting step: reducing end user risks by reducing transaction variation and by establishing a global registration process, setting electronic commerce guidelines for site design managers, determining status of contractual jurisdictional compliance, developing region specific legal checklists and training to ensure compliance, and developing regional resource reference pools using e-mail, public folders, and other electronic tools to disseminate information. The method also includes 2) after the posting step: designing add-on modules to ensure a quality end user experience, drafting agreements with exclusions to exclusive relationships, integrating with Phase Review Discipline (PRD) systems. PRD is a milestone process used when a product moves from kickoff to launch to sales. Certain signoffs are required at regular milestones. Based on the progress point, and the risks presented at various aspects of the product introduction, certain actions must be confirmed and signed off by those responsible (i.e., legal, sales, marketing, technical, etc.), and is used for tracking all new electronic commerce generated offers, and tracking product/service offerings online through customer surveys.

In another aspect of the invention, an inventive method of electronic sale of medical devices includes the steps of considering impact of applicable regulations on electronic sales transactions, creating and then implementing regulation compliance procedures, and integrating order through remittance (OTR) office processes with electronic order collection. The method also includes developing customer credit worthiness procedures, ensuring these customer credit worthiness procedures are implemented and followed, ensuring review of all electronic transactions by key project personnel, and collecting payment electronically for delivery of a medical device.

In accordance with this method, defining key project personnel of a large organization to include one or more of the following positions: mandatory contacts, such as internal end users, regional business leaders, department heads, e-commerce business unit leaders, information technology personnel, sourcing personnel, finance personnel, marketing personnel, e-commerce strategist, web designer, website managers, legal counsel, corporate information technology practice group personnel, compliance personnel, and tax specialists. The method also includes locating each key personnel in one of several geographically divided business units, teleconferencing key project personnel on a periodic basis, summarizing project milestones and action items via electronic mail, and periodically reviewing the progress of the project.

The inventive method may further include developing a method for selling medical devices for use by licensed end users and/or selling only to authorized distributors. This method also includes complying with international trade control regulations, ensuring all transactions comply with internal anti-money laundering policies, and ensuring all transactions comply with applicable jurisdictional law on data protection.

The present invention further relates to a method for designing an electronic transaction system that takes place over a computer network and overcomes the aforementioned problems and meets the aforementioned requirements.

The electronic transaction system disclosed is designed to allow a customer to purchase desired products from unrestricted and restricted product categories with the transaction taking place electronically, thus avoiding the necessity for the seller and buyer to meet face-to-face. The system involves screening the customer, using information requested by the seller and entered by the customer at a user interface to ensure that the customer is authorized to purchase the desired product.

In accordance with one aspect of the system, at least one filtering mechanism includes using a computer network to provide a user interface for a customer to access an automated seller facility, the facility having unrestricted and restricted product service categories. Access to the facility is provided electronically and takes place over a computer network. The purchaser accesses a user interface configured to permit the customer to enter customer data for the purpose of purchasing products. The method also includes preparing a template to receive customer data, which may include identification information, an account number, and a product order from the customer specifying a desired product/service to be purchased over the computer network. The template design may also provide for determining whether the product desired by the customer falls within a restricted product category, and if so, a check is performed to determine whether the customer is an authorized buyer of such restricted product. The template design may further provide for issuing a customer authorization code if the customer is an authorized buyer or if the desired product falls within the unrestricted product category. If the customer and product order have not been approved, the method provides for rejecting the product order. Thus, the template filters out unwanted transactions.

In accordance with another aspect of the invention, the above described steps may also be accomplished by a designing network-based system for screening or filtering transactions. The system includes a customer computer from which a user may order a desired product selected from unrestricted and restricted product categories. The system also includes a supplier network of computers which comprise a two-tier computer system. A first tier computer system is programmed to receive customer data of the kind described above, which is transmitted from the customer's computer. The first tier system is further programmed to confirm that the customer data and order are complete.

The network-based system's supplier network also includes a second tier computer system which is programmed to receive the customer order and data from the first tier system. The second tier system determines whether the desired product, which has been selected for purchase by the customer, is from the restricted product category. If it is, the second system checks to ensure that the customer is an authorized purchaser of the restricted product. "Red flags" are produced if the system detects problems with the data received from the customers thus providing a filtering mechanism for OTR personnel to track and follow up on.

In accordance with another aspect of the invention, a computer memory medium having a computer program for use with one or more computers is used for the development of the aforementioned method. The program when executed causes the one or more computers to acquire customer information. Thus, the customer is able to access by way of a user interface an automated seller facility having unrestricted and restricted product categories. The computer determines whether the product selected by the customer is a restricted product, and if it is, the computer checks whether the user is an authorized buyer of such restricted product. The computer then creates a customer authorization code to indicate that both the customer and the associated product order have been approved. If the order is approved, the computer so notifies the customer. In this way the computer and its associated programs filter out unwanted customers.

Various other features, objects and advantages of the present invention will be made apparent from the following detailed description and the drawings.

BRIEF DESCRIPTION OF THE DRAWINGS

The drawings illustrate the best mode presently contemplated for carrying out the invention.

In the drawings.

DETAILED DESCRIPTION OF THE PREFERRED EMBODIMENT

Figure 1:
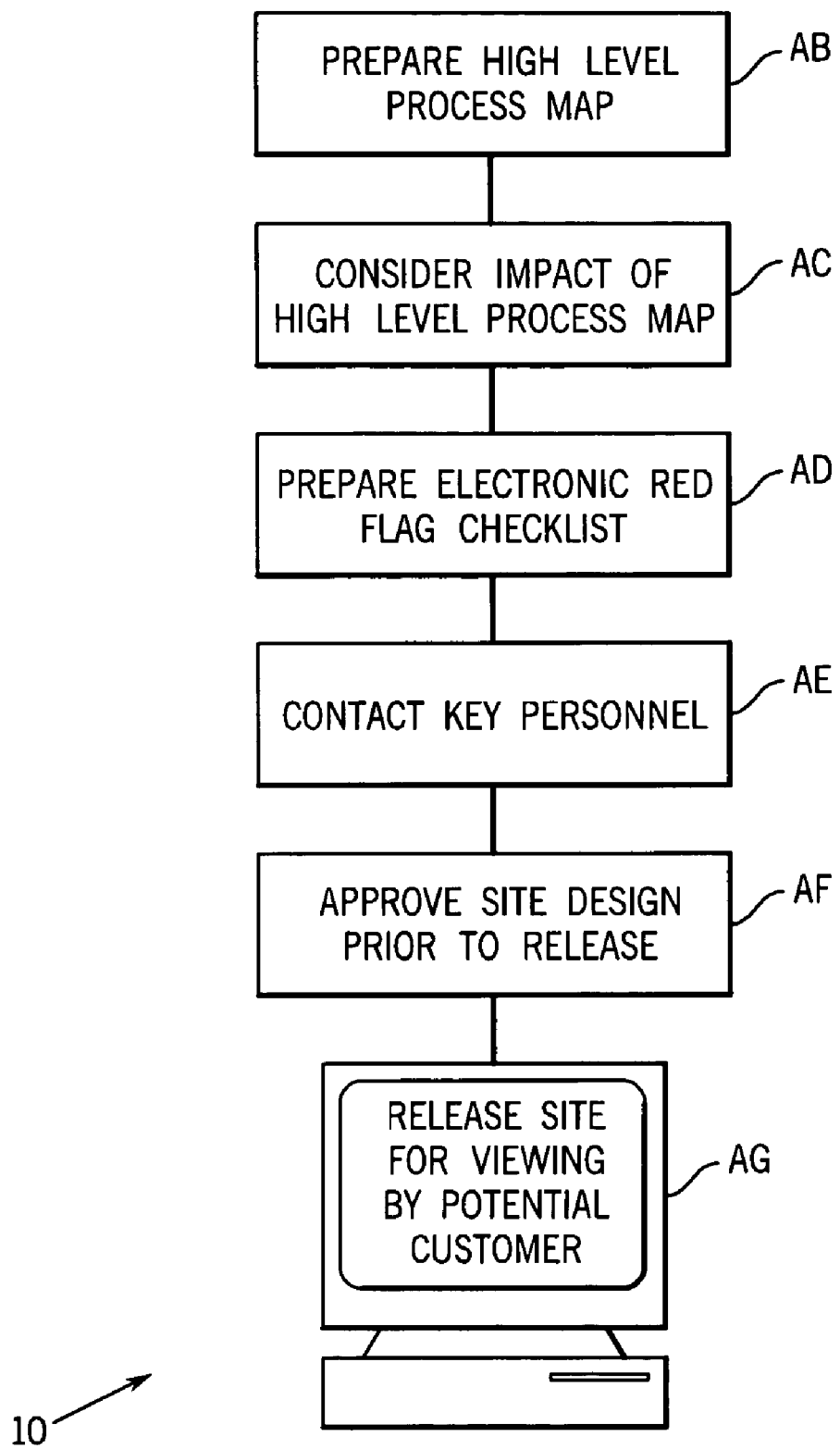
FIG. 1 represents a block schematic showing the flow of high-level steps of the invention.

The present invention is a method of designing an electronic transaction system 10 which is available 24 hours a day to serve customers throughout the world in many different time zones for an organization with diverse operations. Designing such a system can be done in a variety of ways with multiple combinations of steps. In one preferred embodiment, as shown in FIG. 1, the inventive method is set forth as a series of high-level steps. For example, key personnel involved in designing the electronic transaction system first prepare a high-level process map as shown in Step AB. Further, the high-level process map shown in AB may include a series of detailed implementation steps (See FIGS. 12-14) as will be more fully described below. The high-level process map AB allows the key personnel to carefully plan and track the development of the electronic transaction system. As shown in Step AC, the key personnel also use the high-level process map AB to consider the impact the electronic transaction system will have on, for example, day-to-day operations. Another area to consider is the potential impact on traditional transactions outside of the electronic transaction system. For example, certain franchise or third party sales agreements should specifically exclude transactions which may be done within the electronic transaction system. This allows the electronic transaction company to better utilize its resources and prevents redundant sales efforts by making electronic transactions more economical for all parties involved.

Another important step as part of the initial high-level planning process is to prepare an electronic red flag checklist as shown in Step AD. As described in more detail below, red flags may include boycott screening information, anti-money laundering information, shipping billing address checks, etc. These red flag checklists are preferably built into the electronic transaction system's screening process to alert the transacting parties that there may be some special issues which need to be resolved before the electronic transaction can be completed.

During the development of the high-level planning process, all necessary key personnel must be contacted as shown in Step AE. Key personnel lend to the process their unique expertise in a specific area of the transaction. For example, financial personnel are tapped to insure proper development of a credit worthiness check. Legal personnel are tapped to help develop standard contract terms and conditions. Other subject matter experts, such as those in certain business units or modalities for specific pieces of equipment (e.g., ultrasound equipment or CAT scan equipment), are contacted for their expertise as well. Interaction with subject matter experts is important because certain machines may have special transactional requirements in order for the deal to be completed. For example, there may be a certain licensure requirement or a special import/export regulation which must be followed. Key personnel who must be involved are often referred to as "mandatory contacts".

As shown in Step AF, prior to release, the electronic transaction system design must be approved by all appropriate key personnel and business unit heads. Once their input has been received, the necessary changes will be made to the system (e.g., a website) by the site design personnel. Site design personnel may include an e-commerce Strategist (ES) and a web designer at the Customer Web Center (CWC). CWC is the interface to customers for purchasing products and accessing other information from and about the seller.

Ideally, the electronic transaction system planning process is complete once the high-level process map and other above-mentioned steps have been followed and the site has been constructed for release to potential customers as shown in Step AG. In some cases, when the system and corresponding e-commerce site is ready for release, a beta test period begins. During this period potential customers can view the website and the goods and services for sale, but cannot actually make a purchase via the site. This beta test period also allows the site designers to work "bugs" out of the system prior to its "live" release for real electronic transactions. This beta test period further allows a company to receive feedback from potential customers on the "look and feel" and other transactional processes contained therein.

Figure 2:
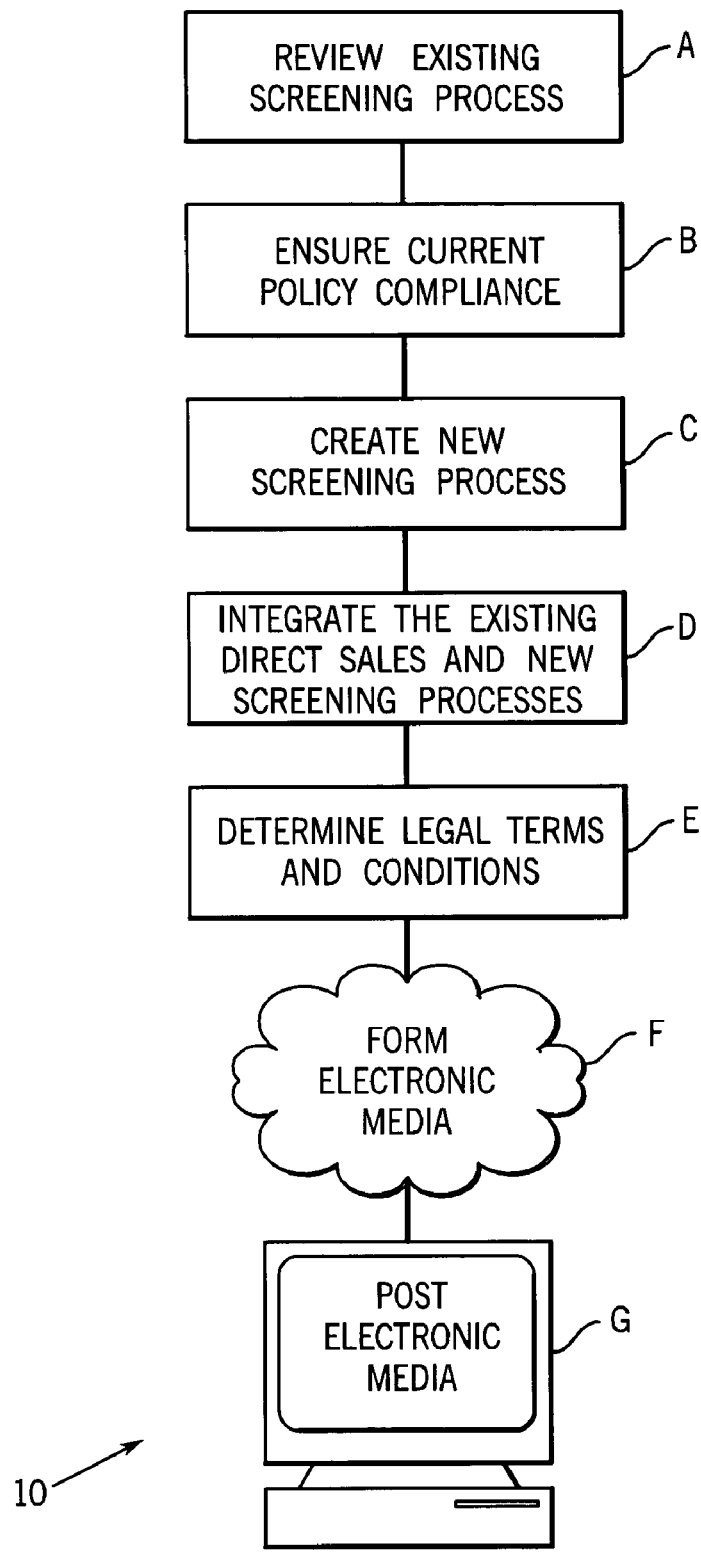
FIG. 2 is a modified block schematic showing process flow of a more detailed aspect of the present invention.

As best illustrated in FIG. 2, during the formation of the high-level process map (See AB in FIG. 1) the ES and CWC review existing transaction screening processes to determine which of these processes should be incorporated into the electronic transaction system. As will be more fully discussed below, these screening or filtering processes ensure that the parties are able to reduce their commercial risk and ensure compliance with the applicable regulations.

As shown by Step B, the company selling the goods and services through the electronic transaction system 10 must ensure that it is complying with the company's current policies. For example, there may be policies in place with regard to: equipment sales to foreign entities, dealer distributor contracts, etc. Most current policies should easily translate into the electronic transaction system. Nevertheless, as shown in Step C, a variety of new screening processes must be created because of the unique electronic transaction marketplace. For example, electronic transactions may be done anywhere in the world at any time. Therefore, it is important that the seller take extra precaution to clearly know its customer. As will be more fully discussed below, a variety of tools may be introduced into the system 10 to help address these issues.

After creating new processes, the ES must then integrate existing direct sales processes with the new screening processes as shown in Step D. This integration will help ensure that the electronic transaction system 10 is complete. For example, the company's prohibitions on sales to certain entities may be manifest within the electronic transaction system by a cross-reference to and electronic check of a database having a list of prohibited transaction partners. Further, an electronic check of financial records may help conclude that a specific potential customer is a high credit risk, and thus, an undesirable business partner.

As shown in Step E, certain legal terms and conditions in agreements must be specially developed for electronic transactions. Legal counsel in conjunction with the ES and business unit head may determine which legal terms and conditions should apply to a specific electronic transaction. For example when the need arises to conduct a proper credit, background, or licensure check, appropriate terms and conditions must be included in the electronic transaction offer agreements to ensure the customer expressly authorizes such a check. If such language is not included, certain countries' laws may be violated. Other terms and conditions may also be present. For example, certain terms and conditions may allow the selling party to back out of the sales offer if certain qualifications are not met. Further, if certain credit or background checks are not passed, special terms and conditions may be in place to allow the selling party to immediately reject the offer without any breach of the agreement. Implementation of these terms and conditions takes place when they are incorporated into actual agreements and offers to purchase.

Once the new and old screening processes have been integrated and the necessary legal terms and conditions have been determined, the ES and the CWC will form proper electronic media to constitute an offer for sale document on the electronic transaction system 10 as illustrated in Step F. Additional review by the unit heads, regional sales and legal personnel, and global legal personnel may take place before the electronic media offer form or acceptance form is complete.

As shown in Step G once all of the necessary personnel have signed off on the electronic media forms, the forms are posted on the selling company's electronic transaction system 10. In one embodiment, the electronic transaction system 10 is made up of a multitude of World Wide Web pages which are accessible over a global communications network as will be further discussed below.

Figure 3:
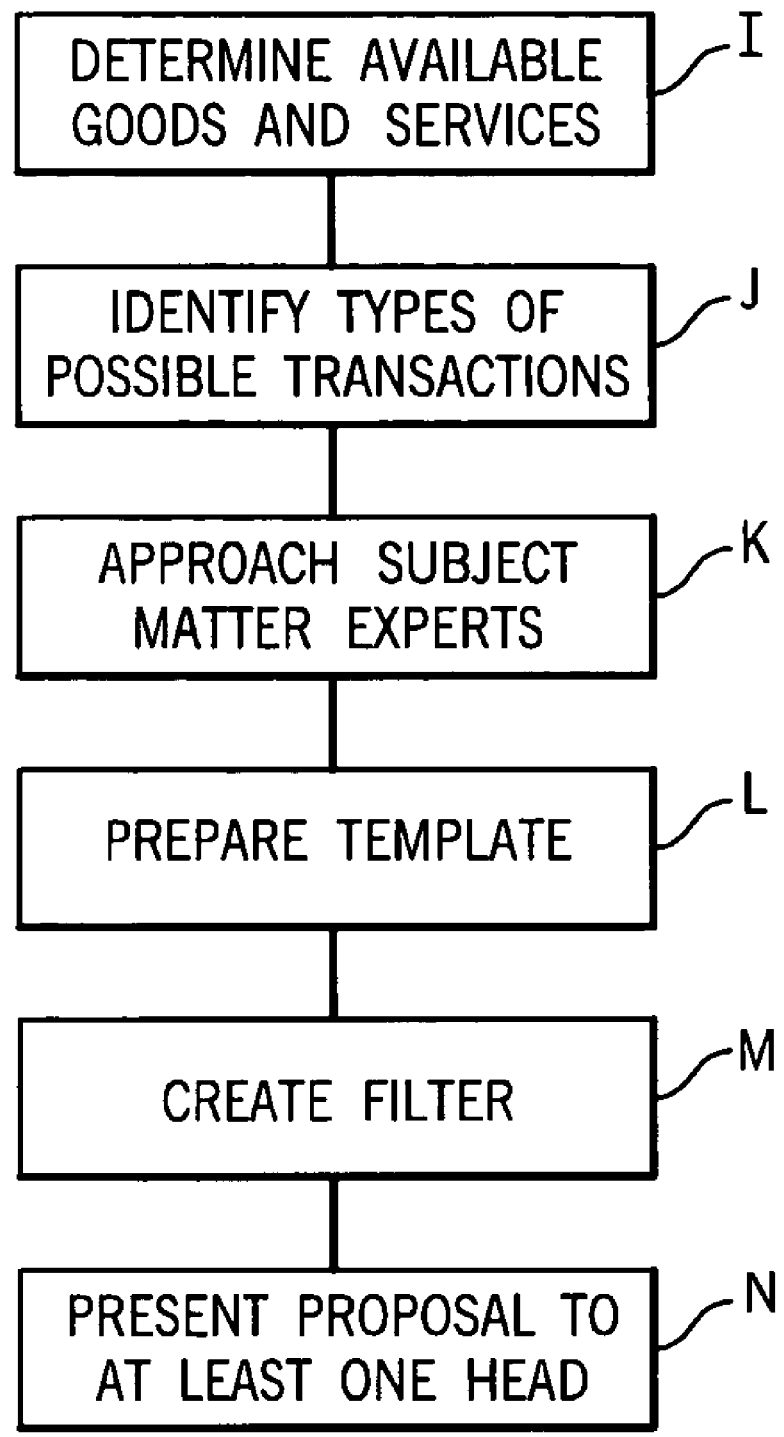
FIG. 3 is a modified block schematic showing process flow of still another aspect of the invention.

As indicated above, before the selling company can proceed with building an electronic transaction system 10, each of the implementation steps must be carefully reviewed before being incorporated. As shown in FIG. 3, the selling company's product and service lines must also be fully analyzed to determine which goods and services may be made available through the electronic transaction system 10 as indicated in Step I. This can be done by carefully reviewing product and pricing catalogs as well as any competitor's site.

As shown in Step J, the review helps the selling company identify which types of transactions may be possible on the electronic transaction system 10. For example, for certain equipment it may not be feasible to incorporate it into an electronic transaction system due to the complexity of the transaction and the various regulations and restrictions involved. On the other hand, some transactions may be simplified through use of the electronic transaction system 10. One such example is a credit card sale.

As shown in Step K, subject matter experts are approached to help identify possible transactions and determine which goods and services are best for being made available on the electronic transaction system 10. Subject matter experts in a particular business unit, for example, may be able to quickly identify problems and potential solutions before unnecessary development time and effort has been expended.

After Steps I through K have been completed, the ES and CWC may use the data collected to prepare templates for the electronic transaction system as illustrated in Step L. These templates are described in more detail below.

As shown in Step M, electronic filters can be created. These filters may be used to check whether a potential customer has a current contract on file, an authorized E-business address, etc. These filters may be integrated with other system components such as the red flag checklist mentioned above to reduce the risk of transacting with the wrong customer. Upon completion of the Steps I through M, the ES and CWC present their design proposal to at least one business unit head as shown at N. The business unit head provides approval to proceed with the development. In fact, many business heads such as chief legal counsel, the business unit modality head, the financial head, and others should be intimately involved in the approval process.

Figure 4:
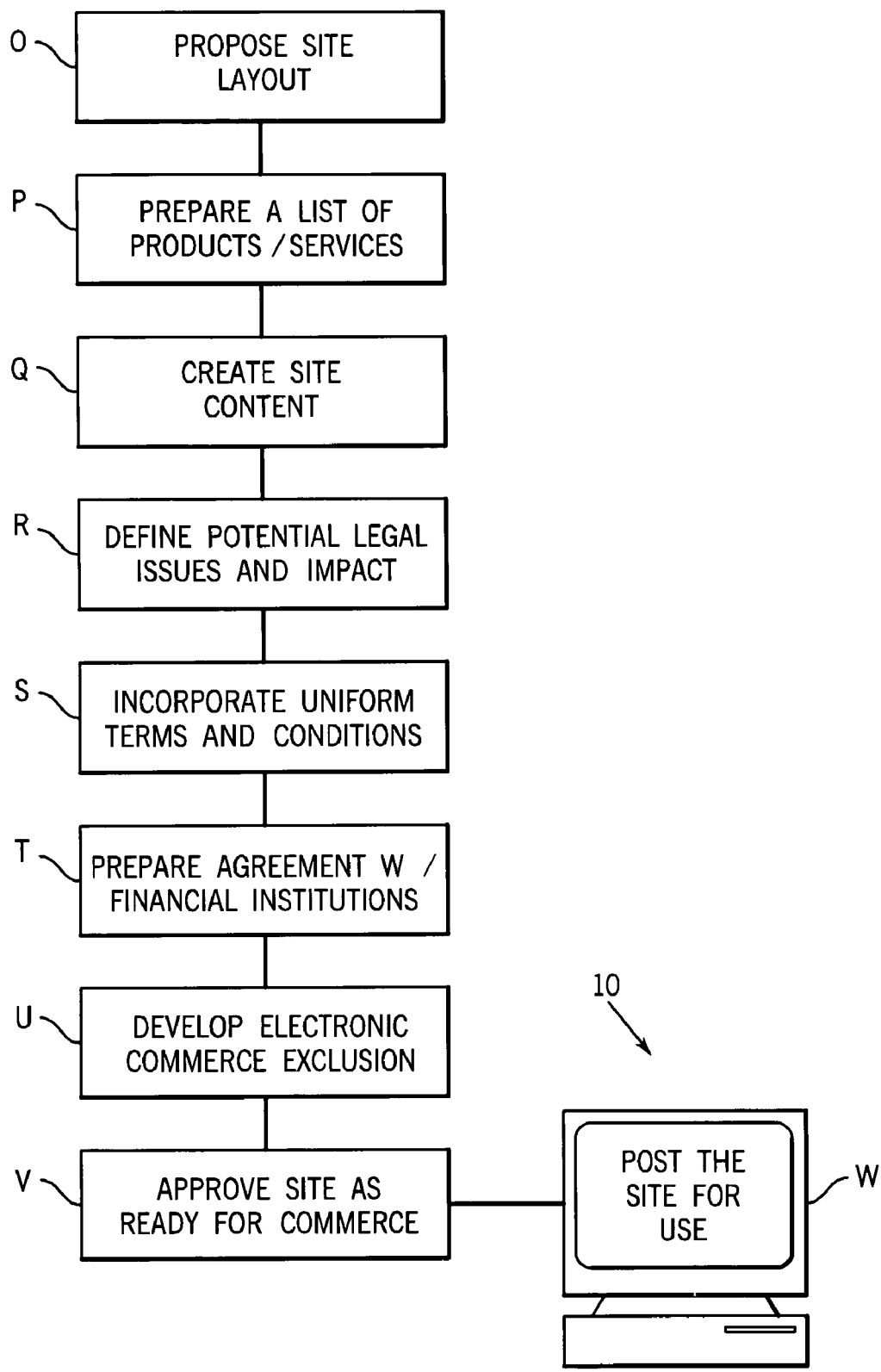
FIG. 4 is a modified block schematic showing process flow of the steps for yet another aspect of the invention.

As shown in FIG. 4, certain additional steps may be implemented before the system 10 described in the steps of FIG. 3 is ready for use. In this embodiment, the ES and the CWC first propose a site layout for the selling company's overall website as illustrated in Step O. As shown in Step P, a list of available products and services that will be offered on the site is prepared following the steps discussed above.

As shown in Step Q, the ES and the CWC begin to create site content incorporating various marketing materials and other collected information on the products and services to be offered over the site 10.

During the content creation process, Step R is followed to clearly define potential legal issues and impacts thereof. For example, if software products are going to be offered on the site, there may be potential problems with exporting that software to potential foreign purchasers who visit the site. Moreover, it may be important to determine what intellectual property issues may be presented by the content of the site. For example, if intellectual property is presented as part of the site content, copyright, trademark, and patent notices should be present. Additionally, a determination should be made as to what, if any, trade secrets are present in the content. Other issues include false or misleading advertising concerns. Finally, certain regional, or country specific legal issues may be present depending on goods/services offered and who the targeted audience might be (e.g., certain Scandinavian countries have laws prohibiting marketing to children and comparative advertising).

As shown in Step S, most of the legal issues can be addressed by creating and incorporating uniform terms and conditions into the site content. For example, certain disclaimers regarding the information presented within the site may be used. Moreover, limited warranties, limitations of liability, import duty requirements, and tax ramifications should be set forth in the contract language presented on the site 10. Further, it is advisable to have affirmative click through windows on the site so that a potential customer realizes the nature and importance of the terms and conditions built into the site contract. Alternatively, terms and conditions may be presented in their entirety and a screen having clickable buttons may allow the customer to enter into the contract by clicking a "yes" or a "no" button.

As indicated in Step T, if a bank or some other financial institution is going to provide a letter of credit or financing terms, a separate agreement may need to be prepared for that specific financial institution. This step is necessary if the selling company desires complete and full payment and appropriate remedies in case of a breach.

As shown in Step U, it may be desirable to develop certain exclusion clauses relating to electronic transactions (or e-commerce) into third party contracts. For example, in certain franchise or dealer agreements with third party resellers, these clauses help protect the selling company's electronic transaction capabilities and ensure they are unhindered by relationships with third parties and/or franchisees. Moreover, franchisee and third party contracts should be reviewed to ensure that their electronic transaction capabilities are limited where appropriate.

As shown in Step V, after the various legal and/or regulatory requirements have been met, the ES and CWC should present the site for approval to the appropriate key personnel to ensure that the site is ready for e-commerce. Final review and approval should take place on a timely basis to ensure maximum impact of the electronic transaction system 10 in the marketplace.

As shown in Step W, the site 10 will be posted for use with the appropriate content and legal terms and conditions. Once posted, the site may be immediately open for transactions. Preferably, the site 10 will be posted on a global communications network to be accessed by any potential customers throughout the world as will be discussed in more detail below.

Figure 5:
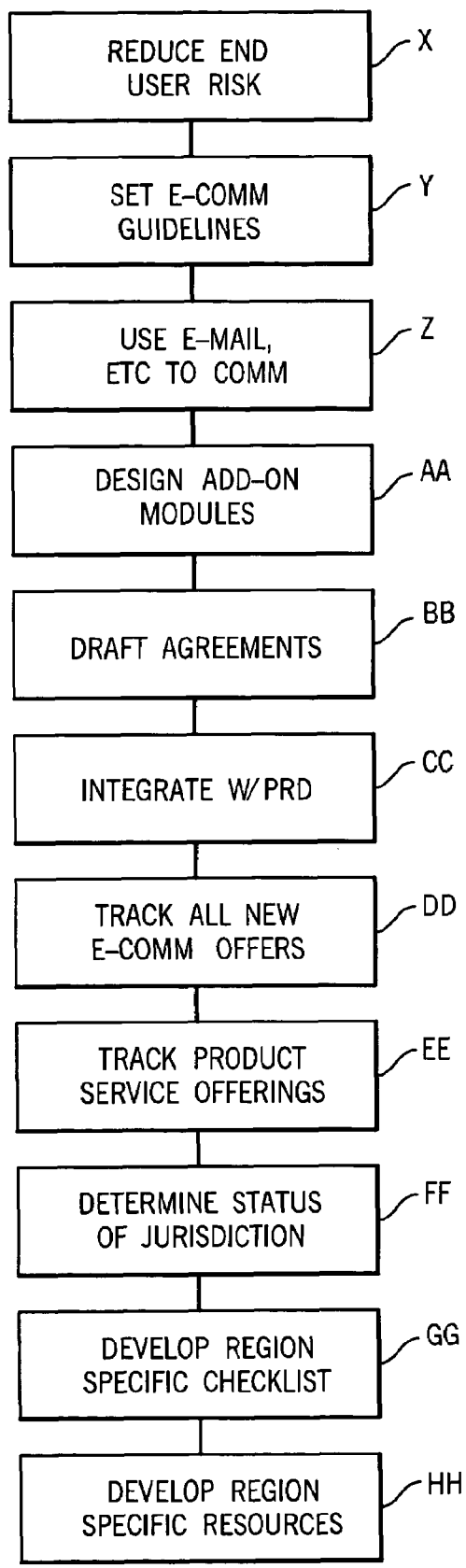
FIG. 5 is a modified block schematic showing process flow of additional steps of the present invention.

As shown in FIG. 5, developing an electronic transaction system can add significant changes to any selling company's traditional transactional process for a variety of reasons. Specifically, as shown in Step X, because new risks are presented in the electronic world, an important area to also focus on is reducing an end user's risk. For example, during the electronic transaction process a variety of financial and other sensitive business data is electronically transmitted between the transacting parties. For a given period of time, this data may be vulnerable to attack or theft. Further, by opening a portal to the selling company's computer system and to the purchasing party's system there may be an increased risk of attack or theft as well. Some ways to reduce these new risks include encryption, establishing firewalls, ensuring viruses are detected and prevented from being transmitted, etc.

As shown in Step Y, a company wishing to utilize electronic transaction system 10 should set clear e-commerce guidelines to help its key personnel develop the necessary processes. Such guidelines include incorporating some or all of the steps mentioned above, such as, developing templates, creating filters, developing key terms and conditions, etc.

As part of the development of the electronic transaction system, and more specifically the e-commerce guidelines, it is important that all key personnel communicate effectively and in a timely manner. Tools which aid along these lines, as indicated in Step Z, include: electronic mail (e-mail), teleconferencing, video-conferencing, an electronic bulletin board system, etc. These tools are particularly effective if key personnel are dispersed across the world.

In a preferred embodiment, other steps may be added to the process map. Such as Step AA, the step of designing add-on modules. These add-on modules may be added to respond to end user feedback or to enhance the end user's experience at the site. For example, such add-on modules may include three-dimensional marketing images, technical drawings, audio visual presentations, glossary of terms, or links other sites.

In addition to the financial agreements that must be put in place for a secured credit transaction, other legal agreements may be drafted as shown in Step BB. For example such agreements may include joint marketing agreements with third party resellers, or even website development agreements with outside vendors to develop specific portions of the selling company's website.

As shown in Step CC, it is important that the e-commerce transaction be fully integrated with the PRD systems. By integrating any e-commerce transaction with the PRD systems, it becomes possible for the PRD to clear the venture, i.e., conduct trademark and patent searches to avoid infringement issues.

After the transaction process has started, it is important to track all new e-commerce offers generated through the electronic transaction system 10 as shown in Step DD. This includes specific tracking of products/service offerings through online customers surveys, for example, as shown in Step EE. After a particular selection of a product has been made, it is also important to track a particular purchase or project's service offering and requirements. For example for certain sophisticated medical equipment, certain areas of the world do not have properly qualified technicians to service the equipment. Therefore, tracking the transactions and offers will allow the electronic transaction system 10 to marry the proper service requirements and potential offerings to a specific region or country.

As shown in Step FF, in order to properly service a piece of equipment or a project and provide appropriate terms and conditions for the offer and ultimate agreement, it is necessary to immediately determine the status of a particular customer's or potential customer's legal jurisdiction. Again, certain countries may have import/export requirements which legal counsel must immediately address. There also may be immigration issues for service personnel, privacy issues, data protection issues, personal information issues, and a whole host of other legal concerns which must be addressed by regional or jurisdictional legal counsel.

To help legal counsel and other key personnel properly address the broad range of potential legal issues, a preferred embodiment, as shown in Step GG, shows that a region specific checklist is developed. Such region specific checklists may be broken down by country as well. For example, in the European Union many Europe-wide specific regulations apply to transactions. However, certain countries, such as Germany, may have a more stringent requirement on privacy than the rest of its European Union neighbors. Therefore, it is imperative that marketing managers and other sales force personnel know the region and country of origin of the purchaser and verify the shipping address so that the correct checklists may be applied.

Closely related to developing a region or country specific checklist is the development of region specific or country specific resources as shown in Step HH. For example, those resources may include mandatory contacts in a specific region such as the company's regional legal counsel. These region specific resources may include documents and other information which help to quickly determine if a particular customer's country of origin is being boycotted or if there is an export license for a particular software product which must be applied for and obtained. In addition, those resources may help determine whether there are service issues and travel visa issues related to the travel of service technicians to that country. These resources may not only include in-house key personnel and mandatory contacts but may also include key contacts at embassies, trade unions, the United Nations, etc. It may also be possible to obtain this related information from resources electronically posted by the U.S. State Department, the World Trade Organization, the International Monetary Fund, the World Bank, etc.

Figure 6:
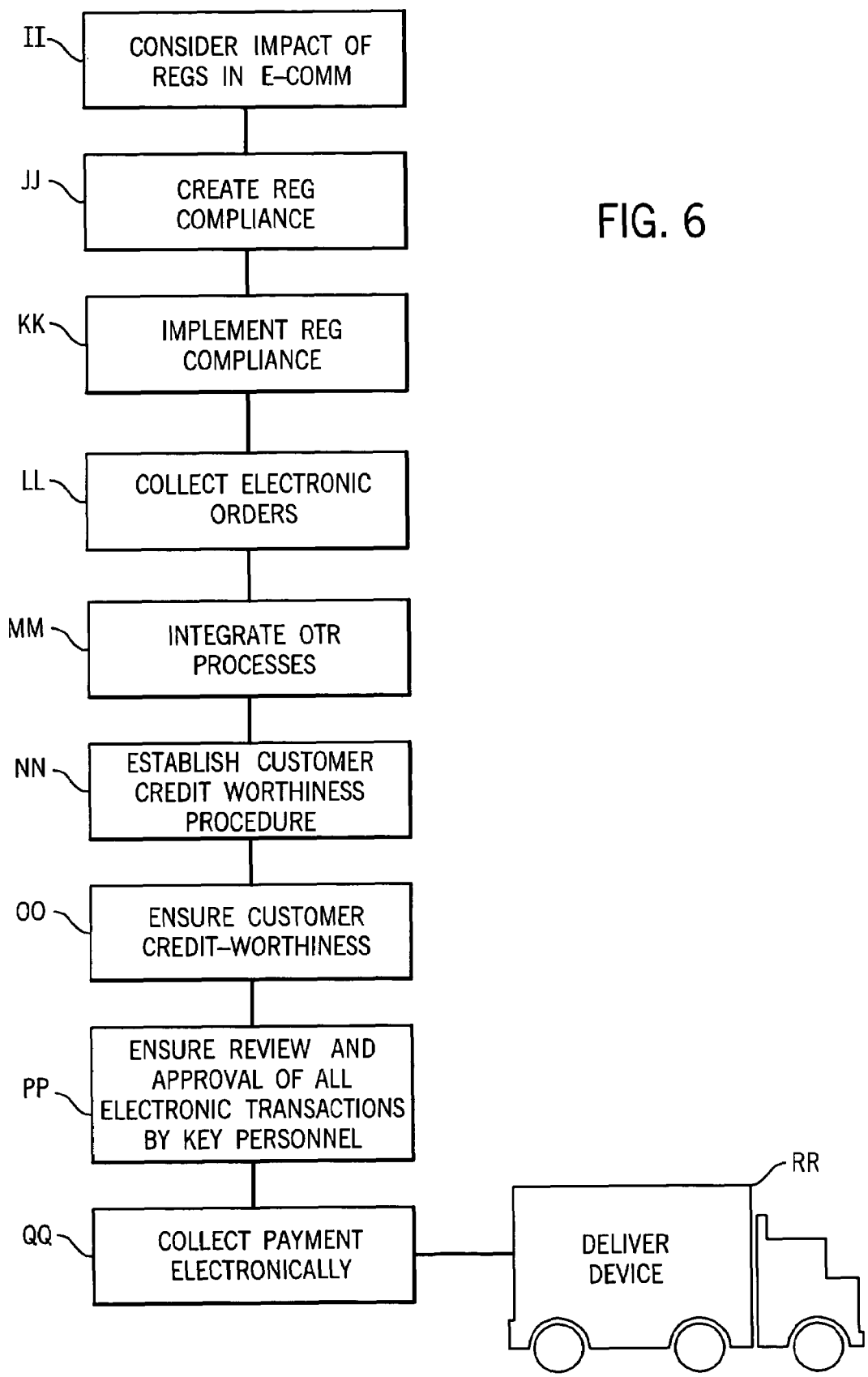
FIG. 6 is a modified block schematic showing process flow of the steps of still another aspect of the invention.

Referring now to FIG. 6, some of the other steps used in the inventive process are shown. As shown in Step II, the impact of applicable regulations on electronic transactions must be considered. For example, travel restrictions for U.S. personnel may hamper the ability to set up and service the purchased equipment. Therefore, it may be necessary to train and use home country or neighboring country technicians.

As shown in Step JJ, specific regulation and compliance procedures should be created to deal with certain regulations dealing with the e-commerce transaction. For example, in order to meet the data protection and privacy standards of a particular country, procedures must be put in place to ensure strict compliance with a company's form and template usage.

As shown in Step KK, implementing regulation compliance must also occur. Fortunately, it can take place in several forms. For example, a privacy policy statement can be posted on the electronic commerce transaction website to warn users of that data collection is taking place. Again, standard terms and conditions can be used for all agreements to protect the selling company's ability to back out of the deal if financing falls through.

As shown in Step LL, as part of the electronic transaction process, electronic orders are collected by preferably the OTR managers initially. Upon collection, as shown in Step MM, OTR personnel integrate the information into the OTR processes to for example: determine the scope of the purchase, credit worthiness, user license information, import/export control issues, customer registration information, etc.

As shown in Step NN, financial experts within the selling company may establish customer credit worthiness procedures. Such procedures may help: track whether a customer is a new or an existing customer, check payment history for that existing customer, request a commercially available third party credit worthiness and history report if the transaction exceeds a certain amount, request advance payments if the transaction exceeds a certain amount, establish credit lines for certain organizations such as hospitals, evaluate the risk of doing business, determine who pays for shipment, establish currency guidelines, etc. Once the guidelines have been established and checked, it is important to ensure that the customer has the necessary credit. Finance managers working in conjunction with sales personnel may be able to make this determination more quickly by using a variety of electronic tools such as databases, templates, filters, etc. To avoid problems, sales personnel must ensure review and approval of all electronic transactions by the appropriate key personnel mandatory contacts. Depending on the scope and amount of a particular transaction the approval may have to occur at very high-levels within the company's treasury department.

One method to reduce the risk of being short-changed on a particular transaction is to establish payment collection electronically as shown in Step QQ. Again, electronic transfers of funds can be set up when financing is secured and may be part of the finance agreement. Preferably, payment occurs before the device is delivered. After all the necessary steps are completed, delivery of the device, as shown in Step RR, occurs.

Figure 7:
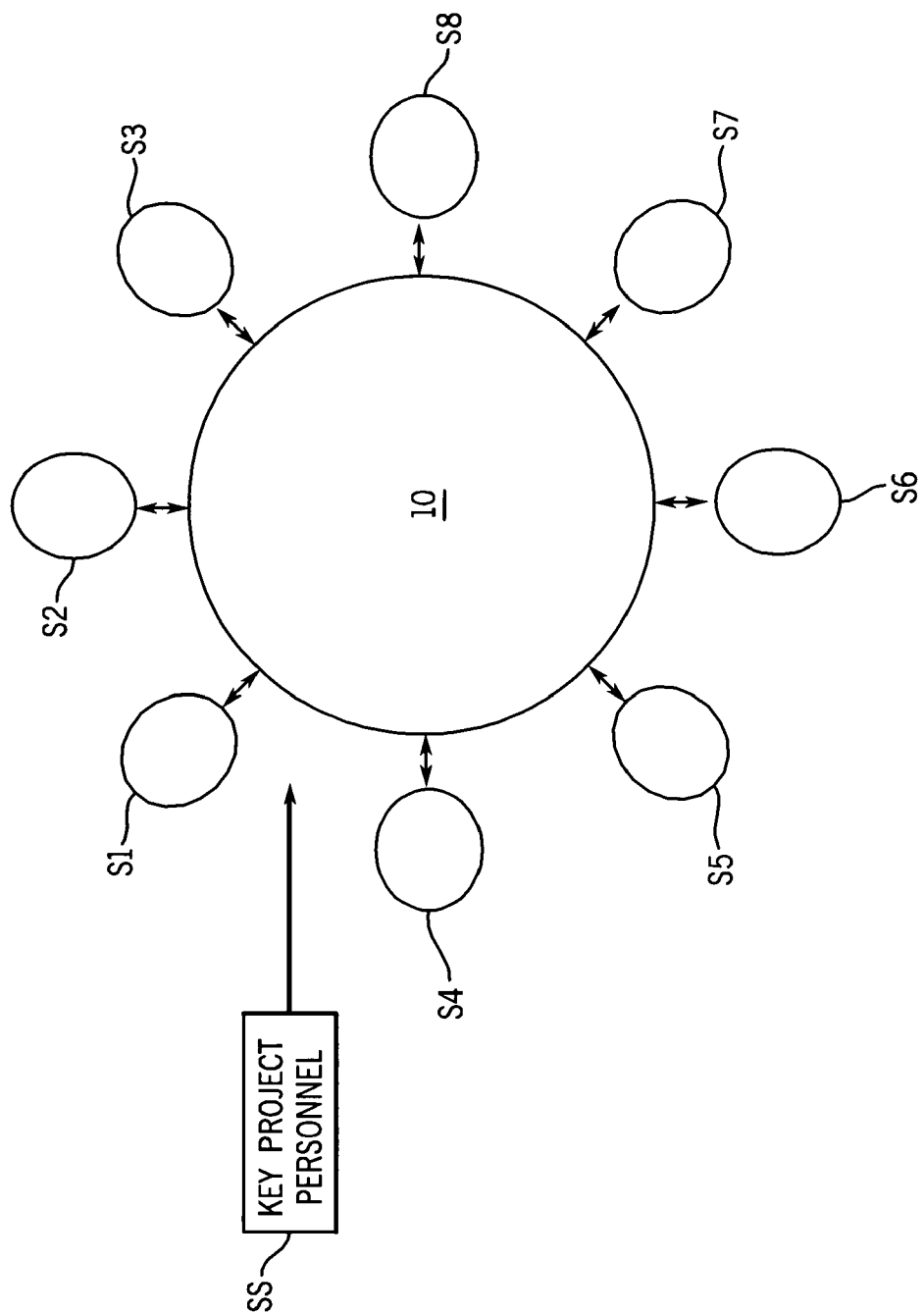
FIG. 7 is a modified block schematic showing key project personnel relations in the present invention.

As shown in FIG. 7, many personnel may be involved in developing the system. For example, the key project personnel SS may include one or more of the following: mandatory contacts S1 (including regional business leaders, department heads, e-commerce business unit leaders, compliance personnel, regional, local and global legal counsel, tax specialists, etc.), information technology personnel S2, sourcing and service personnel S3, finance personnel S4, marketing personnel S5, corporate information technology practice group personnel S6, OTR personnel S7, and E-Strategists S8. As indicated, the development process is essentially a flat one in which all must work together and interact collectively even if they are geographically diverse. Information must be readily available to each through system 10. Further, each has a specific task to implement to make system 10 a reality.

Figure 8:
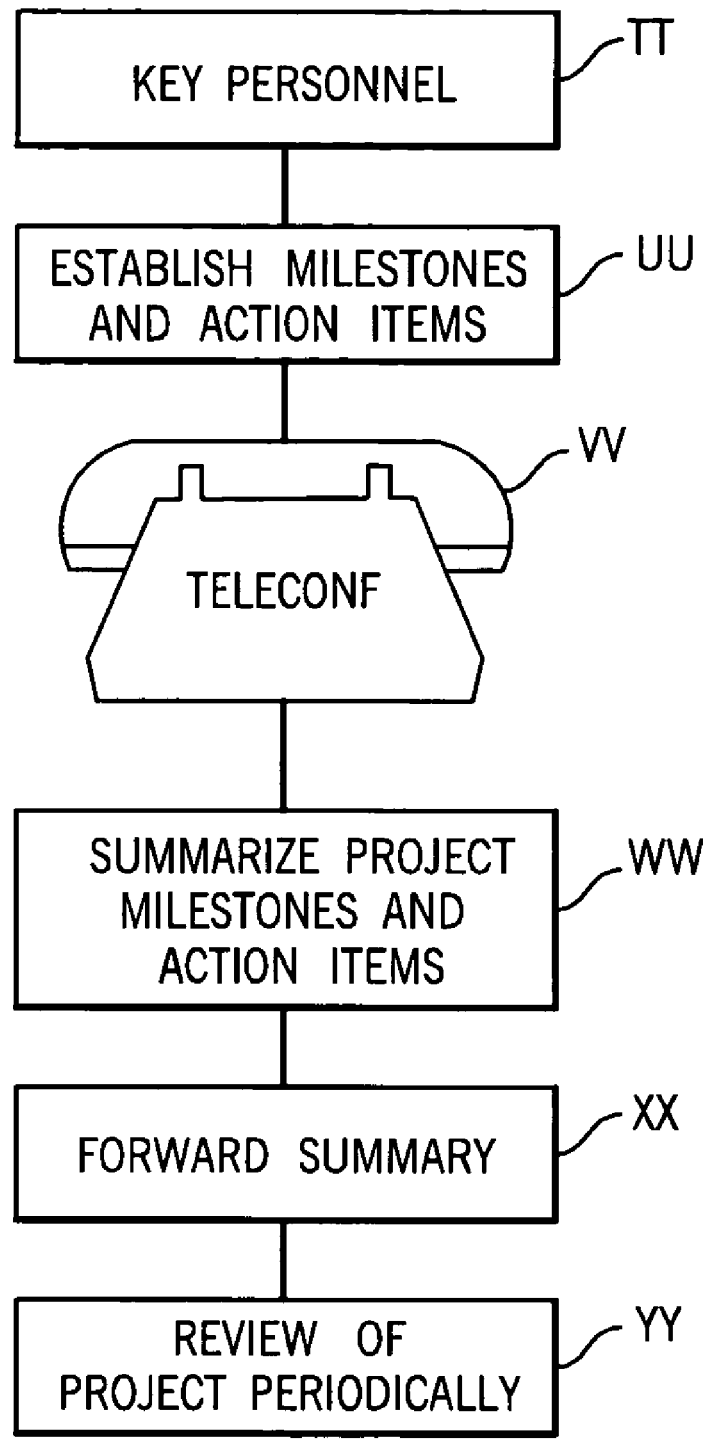
FIG. 8 is a modified block schematic showing further steps of the present invention.

As shown in FIG. 8, the key personnel TT may be in contact in a variety of ways as shown during development of the system and later during approval of an electronic transaction. For example to complete things in a timely manner, the personnel TT may establish milestone and action items UU. The personnel may complete the milestones by teleconferencing VV on a periodic basis as shown. Moreover, project milestones and action items may be defined, summarized, and discussed periodically as shown at WW. These summaries may be forwarded via electronic mail XX or some other system. Such systems and procedures aid periodic review of the projects by the key personnel YY and ensure milestone and action item completion. Various tools are available to aid in this periodic review. For example, several software developers incorporate an electronic scheduler into their e-mail products to signal key personnel that such a periodic review is necessary, when it is scheduled, and which participants are required.

Figure 9:
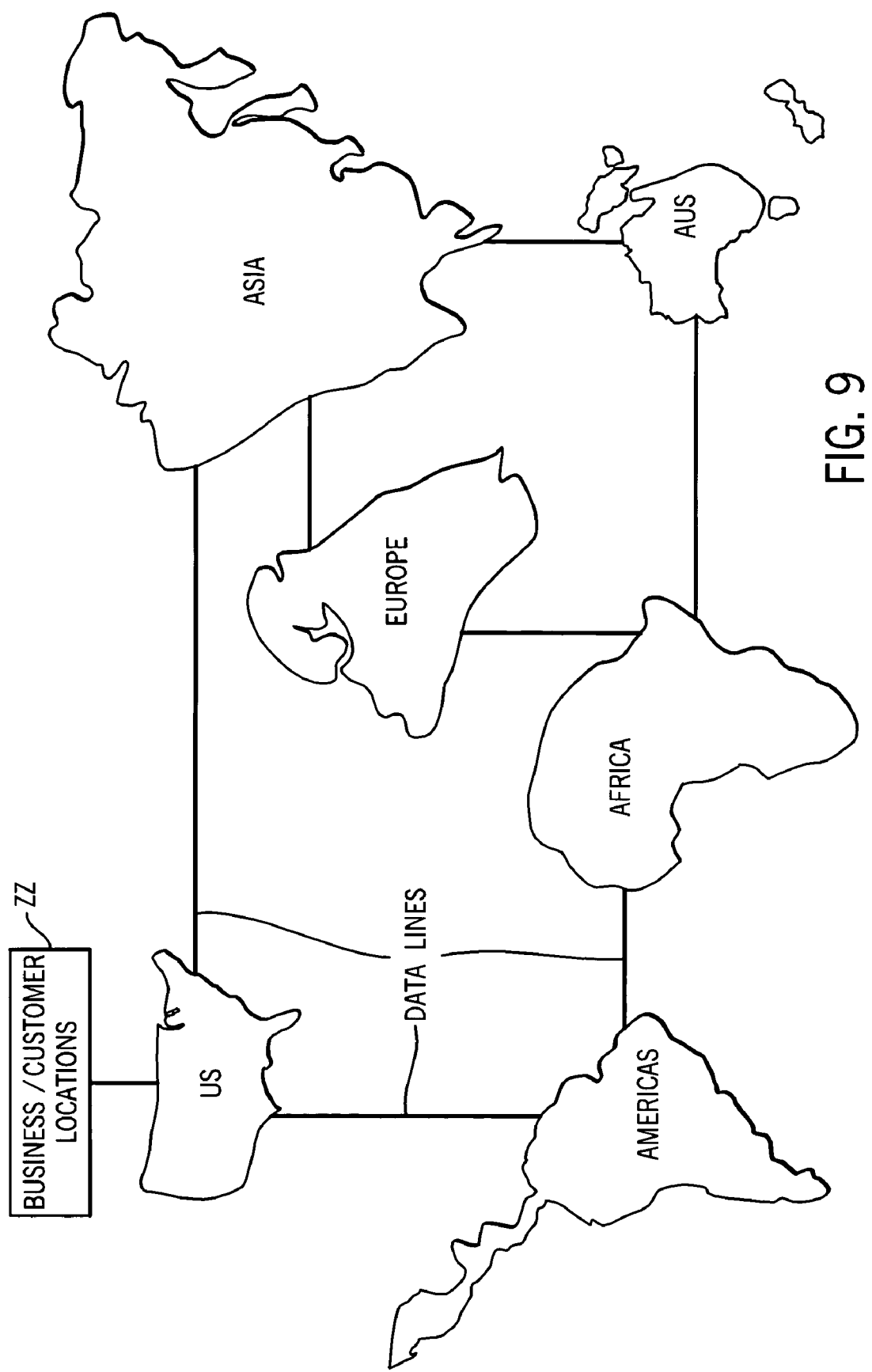
FIG. 9 is a schematic showing business/customer locations in the present invention.
Figure 10:
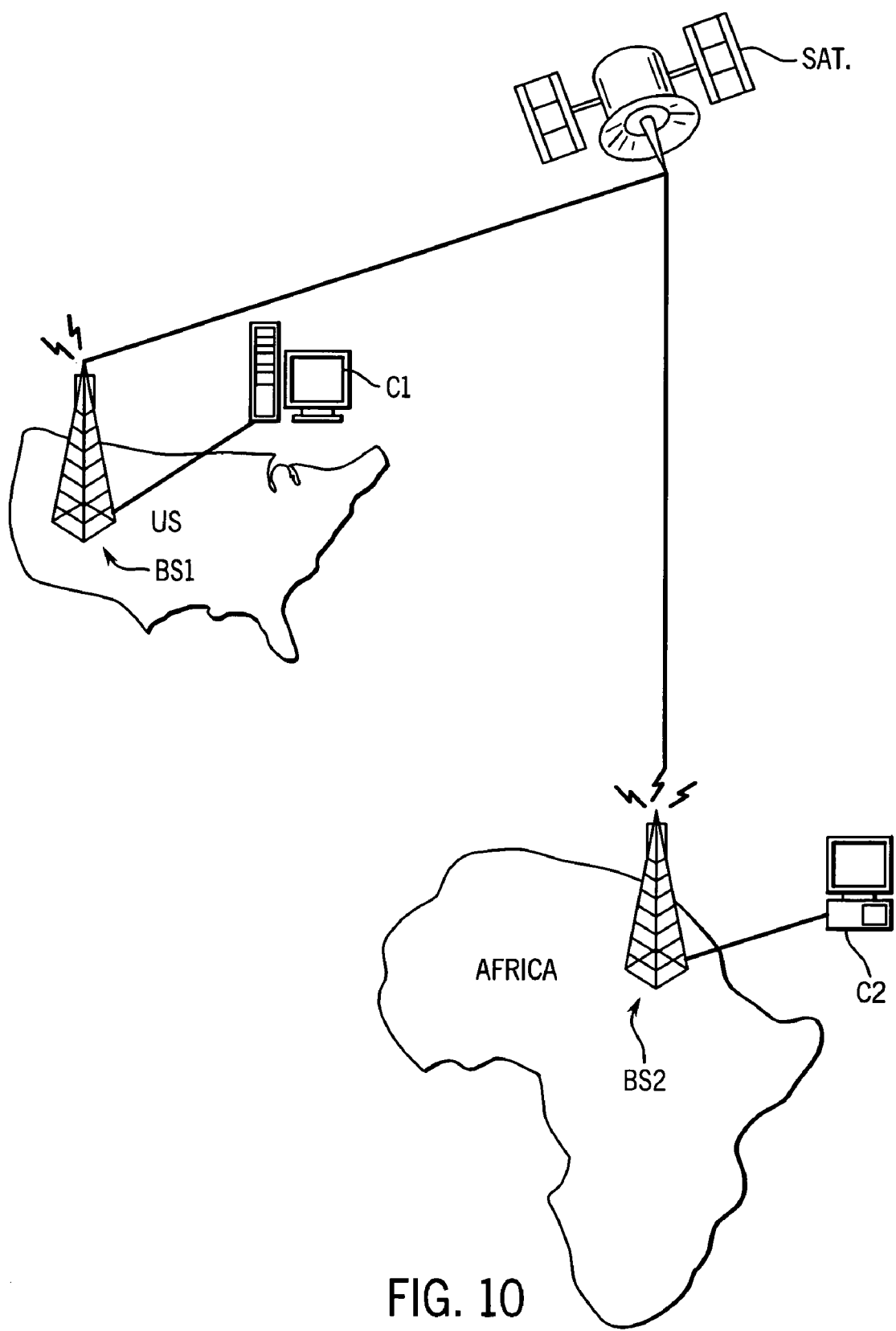
FIG. 10 is a block schematic showing additional aspects of FIG. 9.

An electronic transaction system which utilizes a global communications network, e.g., the Internet, is an extremely valuable tool. As shown in FIG. 9, this network can link business units to consumer locations ZZ on any continent including Asia, North America, South America, Africa, Australia and Europe at generally any time. For simplicity's sake, the illustration merely shows two connections for each region. However, one skilled in the art would realize that each continent may be connected to any of the other continents shown in the illustration. Moreover, these data connections may not only be traditional landlines, ocean buried cables, and fiber optic cables, but may also include telecommunications links which are sent via satellite and/or other wireless communications methods. Such a system is shown in FIG. 10 wherein computer terminals are linked to base stations. A first computer C1 sends information to a base station BS1 which forwards it to a satellite SAT. From the satellite it travels back down to another base station BS2 on another continent and then on to a second computer C2 via, for example, landlines. In some countries, global communications network systems and telecommunications systems are not very sophisticated and frequently break down. Therefore, the selling company must be aware of these limitations, and account for them, as it may greatly affect their ability to transact in those countries.

Figure 11:
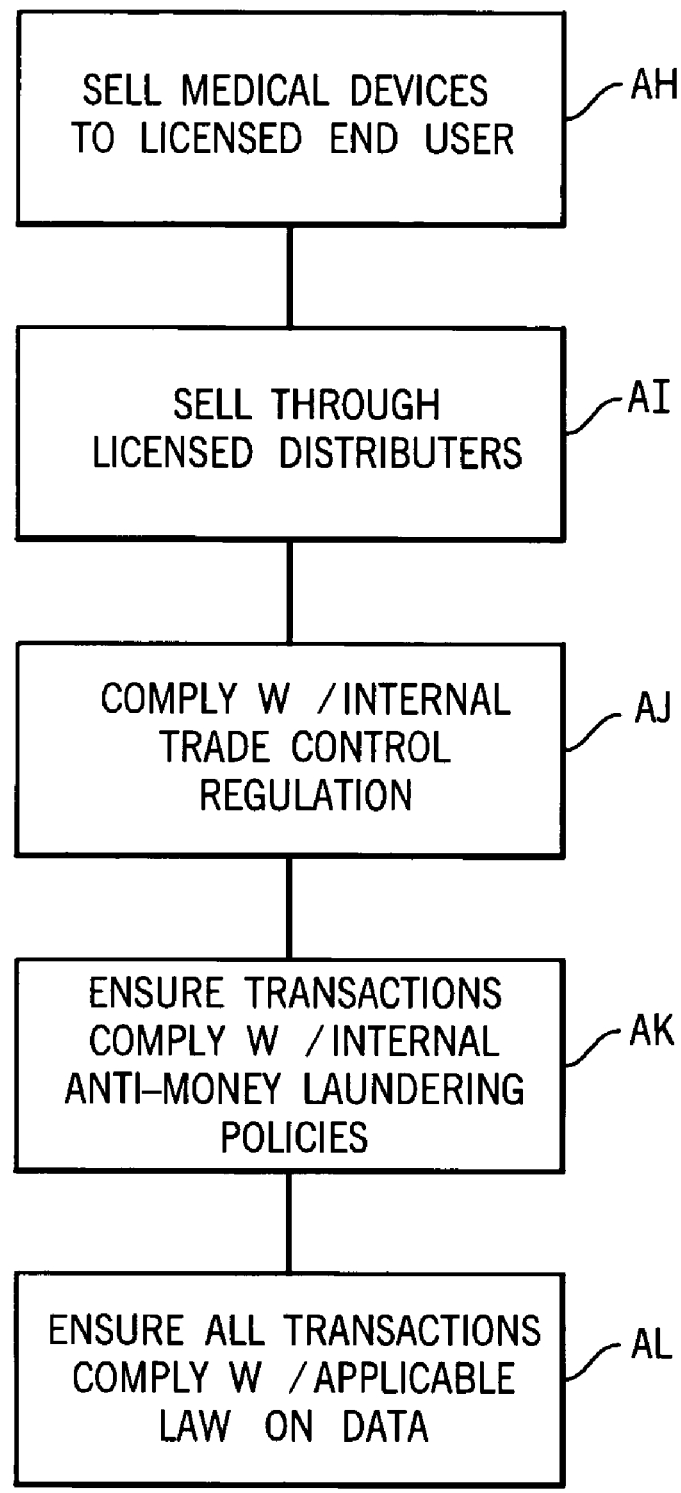
FIG. 11 is a modified block schematic showing more steps of the present invention.

In one particular-embodiment, as shown in FIG. 11, the method may be developed to sell medical devices to licensed end users as shown in Step AH. The process may include transactions which occur only through licensed distributors as shown in Step AI. The medical device sales may be required to comply with a company's internal trade control regulations as shown in Step AJ. OTR personnel may ensure that the transactions comply with anti-money laundering policies as shown in Step AK, for example, by cross-checking the receiving office's address with the transaction party's address, etc. Further, the OTR personnel and legal counsel may ensure that all transactions comply with the applicable jurisdictional law on data protection as shown in Step AL. Various filter mechanisms may be built into the system processors to help with these determinations. For example, certain terms and conditions (e.g., limitations data protections, liability, warranties, etc.) may automatically be applied to the electronic transaction depending on jurisdictional law.

Figure 12:
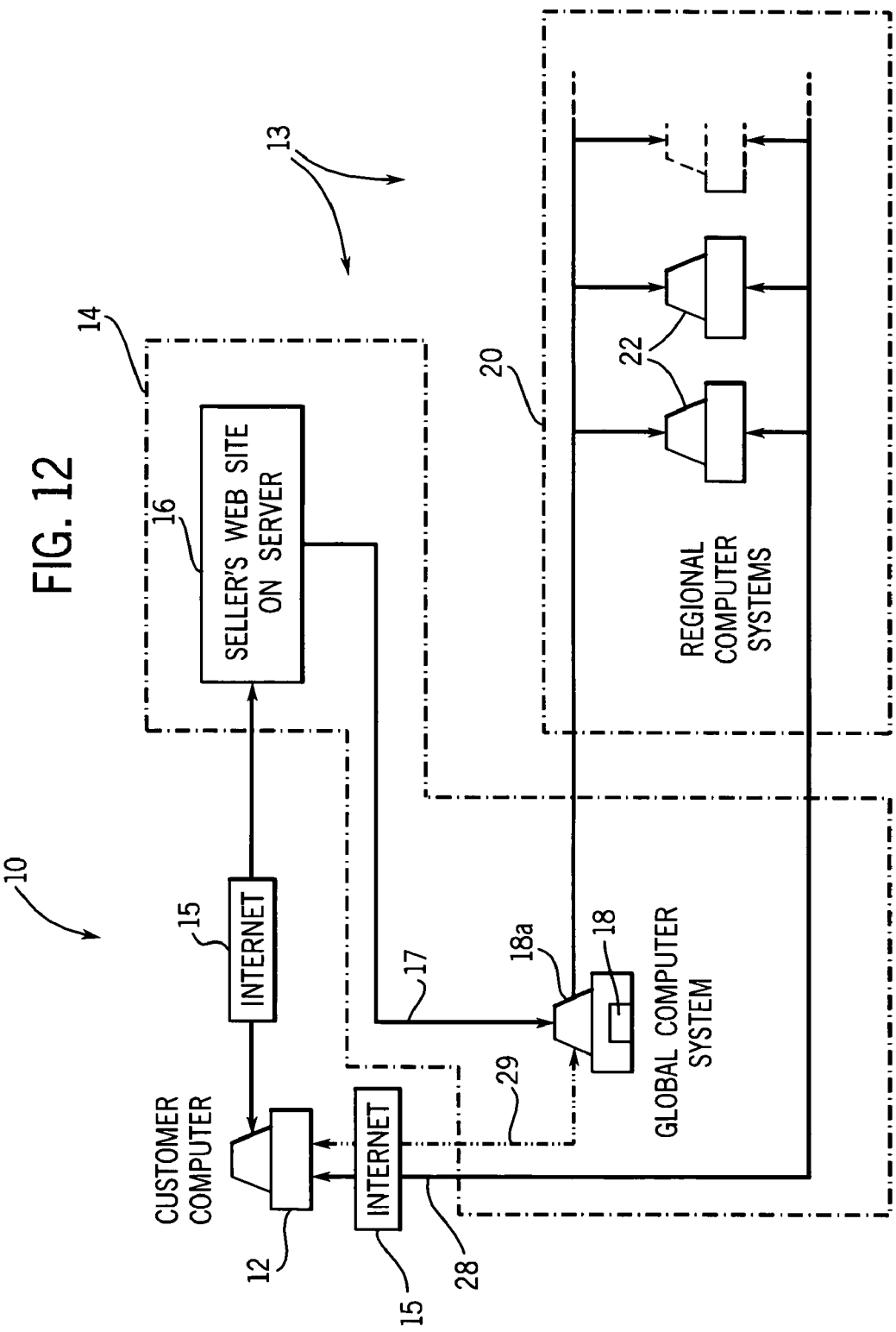
FIG. 12 is a schematic block diagram of a network system for use with the present invention.

FIG. 12 shows the major system components of a preferred computer network electronic transaction system 10 which is developed according to above-described processes to allow electronic transactions. More specifically, the system 10 is designed to control transactions involving the purchase of products and services over a globally accessible computer communications network 15, such as the Internet. The products and services themselves may be restricted for purchase by qualified buyers only, or they may be restricted in that they can be purchased by a general group of buyers.

The system is described in terms of the preferred embodiment wherein the product/service desired for purchase by the customer falls within a restricted product/service category if it includes any of the following: medical equipment, product information and services relating to medical equipment, or service information pertaining to medical services. A non-restricted or unrestricted product/service category includes those which can be purchased by a general group of purchasers. The medical equipment and related services include MR imagers, CAT scanners, ultrasound machines and the like.

Key personnel design the system 10 to delineate between restricted and non-restricted items by, for example, building filter mechanisms and templates into the system 10. In order to purchase a restricted item, the customer must be authorized, or pre-approved. It should be apparent that this system could be applicable to control other types of restricted products, for example, weapons, nuclear materials, chemicals, or biological materials, wherein the restricted products described herein are exemplary only.

The network 10 preferably includes a customer computer or data terminal 12 which provides a user interface to allow a customer to access an automated seller facility 13 by way of a seller's posted electronic media or web site which is accessed through the Internet 15 or another global communications network. The seller's web site itself resides on a server 16, as shown by the "Seller's Web Site on Server" block. The facility 13 has a first tier 14 and second tier 20 screening system.

Once having accessed the seller's web site, which is connected to a supplier network by a communication means 17, the customer provides specific customer identification information. A first tier screening is performed by a filtering mechanism 18 within in the global computer processing system 18a connected to the communication means 17. The seller's computer system receives the customer information from the customer computer 12, including a product order specifying the desired product and customer account number, if there is one.

After the initial screening in the first tier system 14, an approved prospective purchase offer proceeds to a second tier system 20 having regional computer systems 22 connected with the global processing center 18a. The regional systems 22 are preferably situated in the buyer's country of business or in a country having a processing center responsible for a number of countries, one of which is the customer's designated country. The regional systems 22 are considered to be part of the second tier screening system 20 because of the level of processing required and the databases needed. If the buyer and seller are located in the same country, the regional computer systems 22 may be located in the same country as the global computer systems 18, and thus could be incorporated into the first tier system 14.

The regional processing centers 22 constitute the second level or tier system 20 for screening the transaction between the seller and the customer. The specific methods for screening will be discussed below with reference to FIGS. 13-15. Generally, the second tier computer system 20 receives the customer information, determines whether or not the desired product is within the restricted product category, and further checks to ensure that the customer is an authorized purchaser of the product selected for purchase or to an unrestricted location, as well as performing a credit worthiness function. The overall system 10 permits direct correspondence, such as by e-mail, via communication means 28 and 29 between the customer accessible computer 12 and the global and regional processing centers 18, 22. Communication means 29 is dashed to indicate that direct correspondence between the customer accessible computer 12 and the global processing center 18 can take place when the global processing center conducts second tier screening of the customer. Direct communication is possible throughout the processing of the transaction as will be further described hereinafter.

Figure 13:
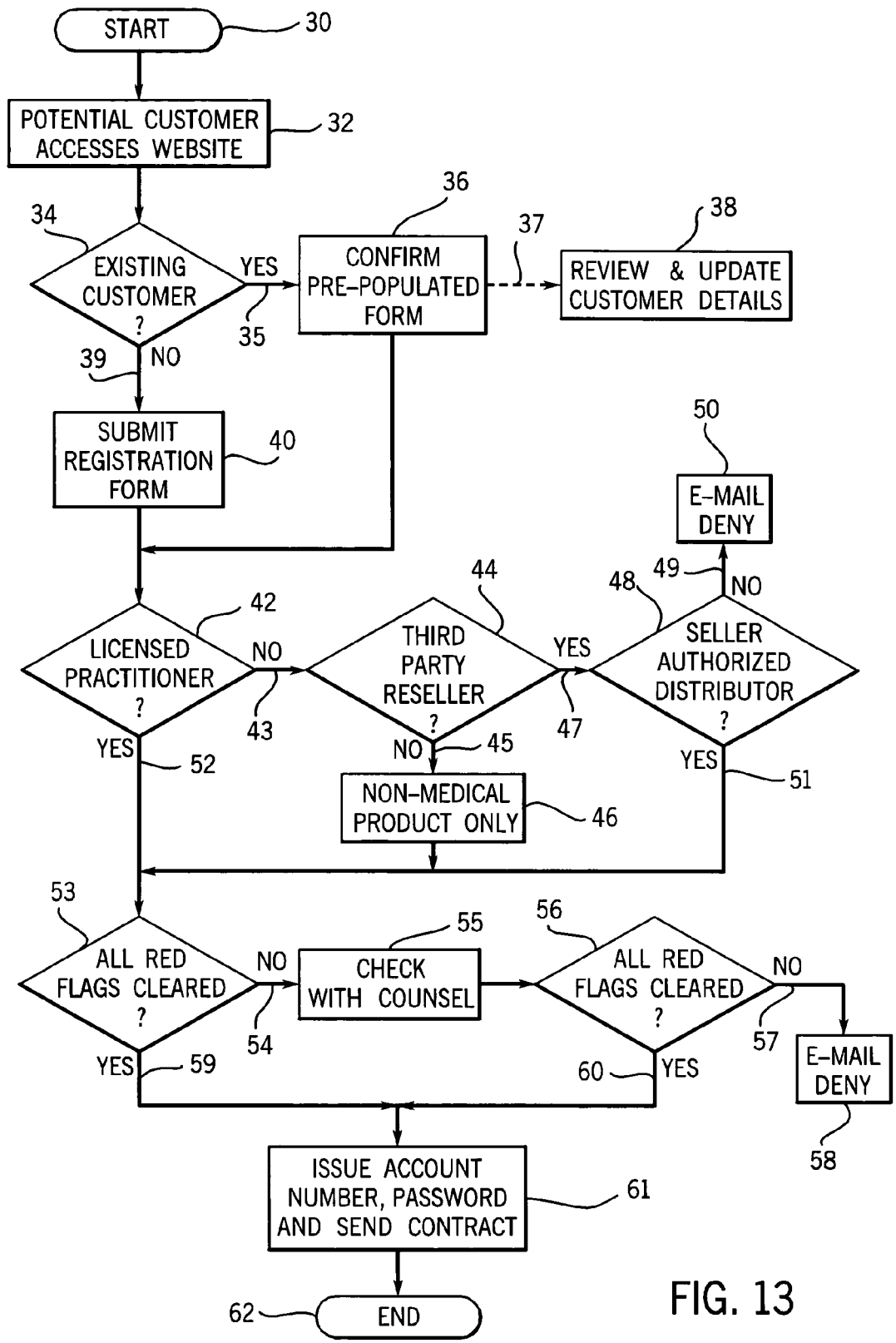
FIG. 13 is a flow chart representing one embodiment of the present invention for use with the system of FIG. 12 when used by a potential customer without an account number.

In FIG. 13, a potential customer initiates a transaction 30 to purchase products, which have been sorted into unrestricted and restricted product categories, by using a data terminal to connect to the Internet, and subsequently, to gain access to the seller's web site 32. After accessing the web site 32, the system checks to determine whether the customer is an existing customer 34 with an account number. If so 35, an online registration form is provided having fields for customer data that are already entered using information stored in a seller-accessible database. It is then the customer's responsibility to confirm the pre-populated customer details 36 for correctness. Customer data might include: customer name, billing and shipping addresses, country of residence, entity type (i.e., corporation, partnership, individual) as well as other required pertinent information. Preferably, such customer details will be updated 38 in a database and the information will be screened and reviewed. The periodic nature of such updates is represented by a dashed line 37. If the customer is not an existing customer 34, 39, the customer submits an online registration form 40 to provide the seller with the requisite customer identifying information.

The registration form itself includes a number of fields to be completed by the buyer in a user interface, preferably a graphical user interface, which is provided by the seller's web site. The submitted registration form 40 must have every required field in the user interface properly completed. Where required data is missing or immediately determined to be invalid, such as an improper zip code, the system will restrict the customer from transacting until the required fields are completed. A country designated by a customer must be a country in which the seller is authorized to do business. All such permitted countries may be provided by the seller, for example in a drop-down menu within the graphical user interface. The OTR personnel resolve any issues related to invalid customer registration. Business modality heads or other key personnel may be called upon as well.

Once a valid customer registration form has been submitted 40, the system then proceeds with determining whether the customer is authorized to purchase the desired product over the network 10. This is accomplished by checking whether the customer is a licensed health care provider 42, as such providers are authorized to purchase restricted medical products. If the customer does not fall within the licensed health care provider group 43, the system automatically checks to determine whether the customer is a third party reseller or distributor 44 of medical products. If not 45, the customer will only be permitted to purchase non-medical products 46 in the transaction, or, more generally, products from the unrestricted product category. If the customer does qualify as a third party reseller 44, 47, the system checks to determine whether the customer is a distributor who has been specifically authorized by the seller 48 to purchase medical products. If not 49, the system will deny any sale to the potential customer and an e-mail indicating the denial will be sent to the customer 50, alternatively, a direct customer contract or interaction may be made. These checks ensure that medical products are purchased for use by only those who are authorized. Further, they function to ensure that sensitive pricing and/or product information may only be accessed by such authorized customers.

If however, the customer is a seller-authorized distributor 48, 51, and similarly if the customer is a licensed practitioner 42, 52 or is buying for use by such a licensed practitioner, the system checks to determine whether all "red flags" have been cleared 53. Red flags are inconsistencies in the customer-provided data such as: customer identification details that do not appear to match those of a medical practitioner, clinic, or hospital; a customer who appears to be an overseas purchasing agency, although based in the seller's country; and different billing and shipping addresses. OTR personnel are generally responsible for clearing all red flags. If all red flags are not cleared 54, the system provides for contacting and checking with the appropriate counsel 55, such as legal counsel or contract manager, who then document and review the relevant issues.

Once accomplished, the system revisits the question of whether all red flags have been cleared 56, and if not 57, the customer is prohibited from transacting further and is sent an e-mail 58 indicating the same. If all red flags are cleared 53, 59 or 56, 60, the customer has been determined by the system to be an authorized buyer of restricted, and in this case medical, products or even unrestricted products but not to restricted locations. As such, the system then issues the customer an account number and password, and then proceeds to send the customer an electronic business contract, if not an existing customer 61. The contract can then be completed after the customer obtains the authorization code, which can include the account number and password or login ID so as to enable the customer to proceed while the contract is processed. The account number and password or login ID, which are unique to the particular customer, provide the customer with the appropriate security access to proceed with their intended purchase. This completes the flow chart process 62 of FIG. 13.

Figure 14:
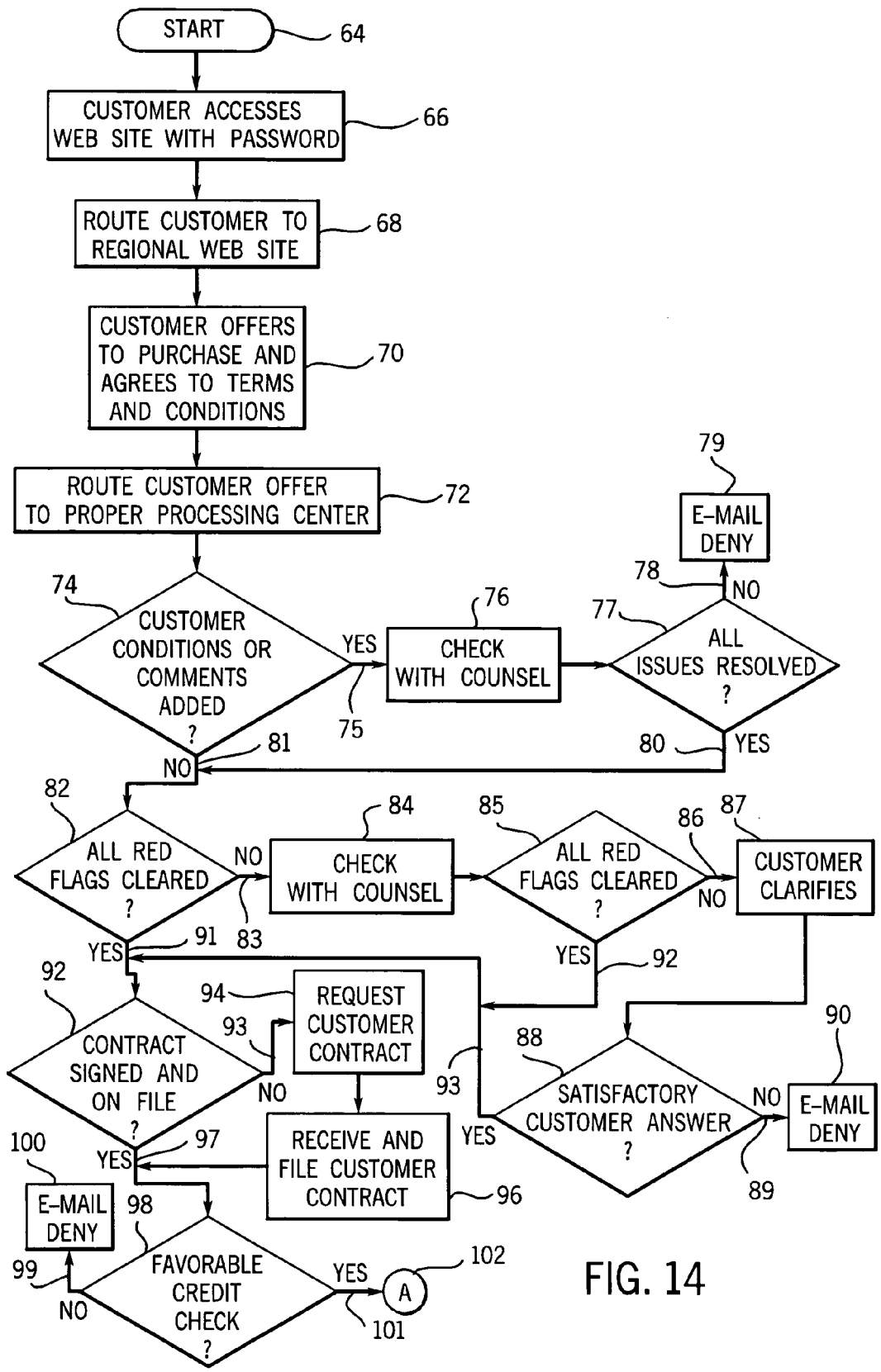
FIGS. 14 and 15 are flow charts representing one embodiment of the present invention for use with the system of FIG. 12 when used by a customer after an account number is assigned.

Referring to FIG. 14, the customer begins 64 the second tier of screening by accessing the seller web site 66 using the account number and password acquired at 61 of FIG. 13. The customer is then automatically routed by the system to a regional web site 68, FIG. 14, or in other words, a web site whose content specifically pertains to the destination country of the desired product, the buyer's country. This is done to ensure that sensitive pricing or pertinent terms and conditions of sale and/or information which the customer accesses is from the relevant country only, and further, to provide for efficient access to that information.

Next, the customer proceeds with making an offer 70 to purchase products, and in so doing, the customer agrees to the terms and conditions of sale which have been defined by the seller's legal staff. The terms and conditions include such items as allowing the seller to run a credit check on the purchaser and stipulating specific financing terms to ensure that the purchaser is indeed authorized to purchase the products specified in the product order. In rare conditions, the customer may, if he chooses, ask if additional terms and conditions can be added or the existing terms and conditions be modified, or simply state additional comments, if desired. Once the offer is sent by the customer, it is routed to the proper regional processing center 72 where the information provided by the buyer may be further evaluated. The offer to purchase is then checked to determine if any terms and conditions modified or additional terms and conditions have been added 74 by such buyer. If so 75, the buyer-specified terms and conditions in the offer are checked by counsel 76 to resolve any potential issues and to ensure that such terms and conditions are satisfactory to the seller. If any issues are raised by the buyer in the form of additions or modifications to the offer are not resolved to the satisfaction of the seller 77, the customer is again sent an e-mail declining the purchase offer or requesting additional clarification. If, however, all issues are adequately resolved 77, 80, the system will check—as it would if the customer had not added any language to the standard offer to purchase 74, 81—to ensure that no red flags exist 82 which could potentially prohibit a sale to the prospective buyer. The "red flags" checked may include, in addition to the items described above, abnormally large purchase orders or unusual payment terms. Also, a red flag may be triggered if the customer designates a proscribed country as a product destination in which such product/service is not allowed delivery into.

Still referencing FIG. 14, if red flags are raised 82, 83, the system again routes the purchase offer to be checked by the seller 84, preferably legal counsel or contract manager. Once checked by legal counsel 84, the system ensures that all red flags have now been cleared, and if they have not 86, the customer is given the opportunity to clarify the problem areas 88 by providing answers to questions related to the red flags. These answers are checked 88, but at this point if they are deemed unsatisfactory 89 by the seller (or seller's representative or counsel), the buyer is informed via e-mail the purchase offer must be denied 90. On the other hand, if all red flags are cleared, either prior to checking with counsel 84 as in 82, 91, or after, as in 85, 92 or 88,93, the offer to purchase is permitted to proceed.

Next, this system checks whether a signed contract has now been received and is on file 92 at the processing center. Preferably, a hand-written or "hard" signature will be on file and the signature will be a verified one. However, it is contemplated that the invention may also provide for electronic signature validation. The purchase offer may also need to come from the agreed source and/or electronic login. A customer contract with signature will be requested 94 if it is missing 93. The customer is given a number of reminders, preferably via email, to return the executed contract. If the customer does not return the contract after a predetermined number of requests have been made, the customer is sent an email denial notification. Conversely, once the contract with the appropriate signature is received for filing 96, the system is allowed to proceed with the transaction. Once the contract is signed and on file 97, the system determines whether the customer's credit is favorable 98. If not 99, the customer is denied and the customer is notified via e-mail 100. If the customer meets the requisite credit qualifications 101, the customer may proceed with the purchase 102, FIG. 15.

Figure 15:
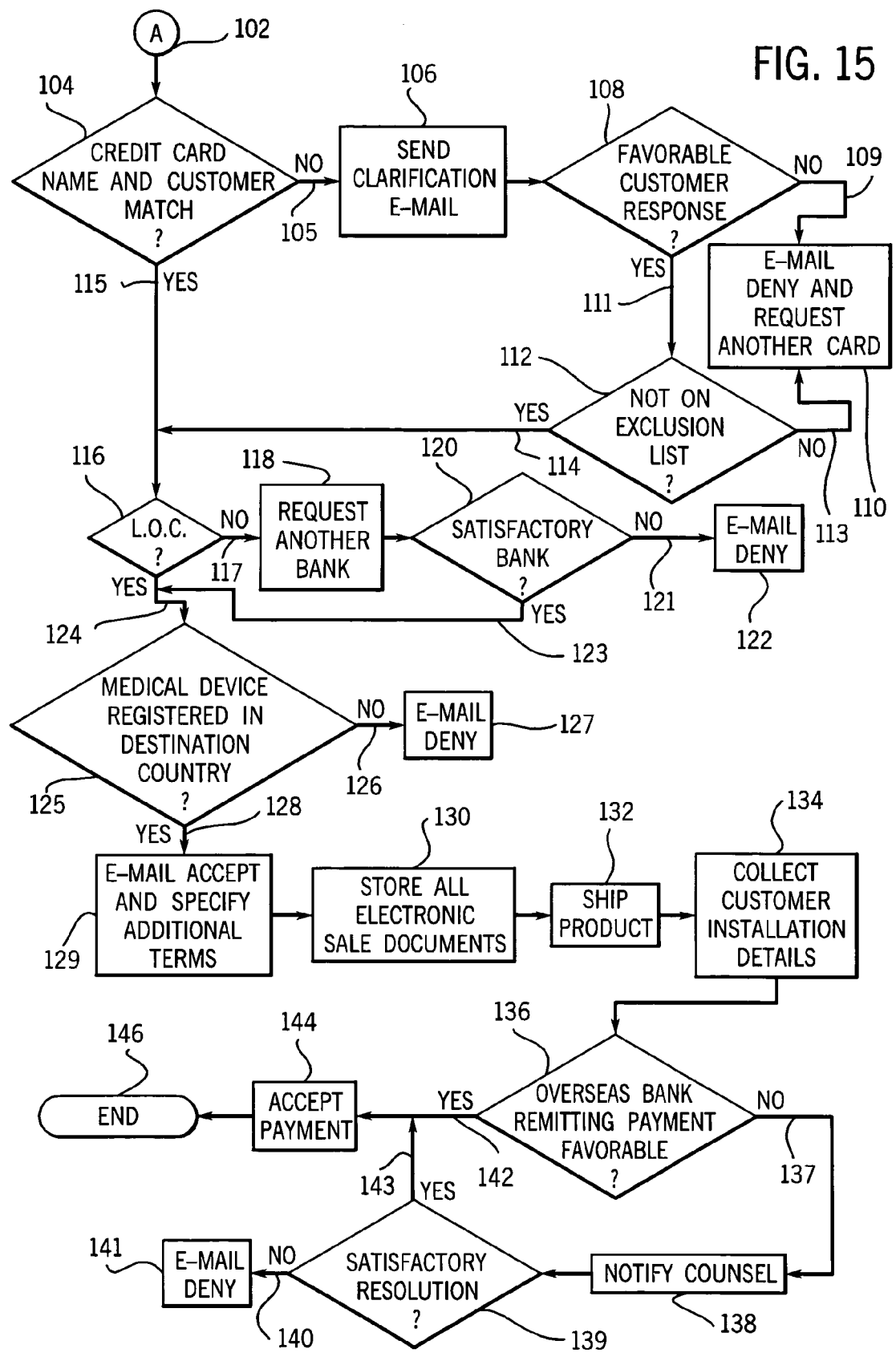

Referring now to FIG. 15, the system next determines whether the name associated with any credit card used for purchase matches the customer name 104, and if not 105, clarification e-mail is sent 106. This step is significant in thwarting any money-laundering attempts by a potential customer, who is known to the seller only by the data entered. Without an acceptable customer response 108,109, the system will deny any offer to buy and request by e-mail 110 that a different credit card be used by the customer. Following a favorable customer response 108, 111, the system will check 112 whether the customer is on a seller-determined list of excluded customers, such as those identified by the relevant government authorities, and others with whom the seller has had an unsatisfactory transaction history. If the customer is found to be on any exclusionary list 113, the customer will be denied 110 as described above. Otherwise, at 112, 114, the system will permit the customer to proceed 115, as it did at 104, 115 wherein the credit card name and customer matched initially.

The system next checks the prospective approved purchaser to determine whether a letter of credit has been opened on their behalf 116 if the purchase is not by credit card or similar form of payment. If so, the system checks whether the designated overseas financial institution is not on an exclusionary list because of irregulatories such as suspected money laundering. The system is also configured to check for whatever qualifications the seller may select. For example, the system may be configured to check for past transactions involving the particular lender to determine whether a letter of credit should be accepted. If the customer has indicated an unapproved lender 117, the system requests that the customer select another institution 118. Once another selection has been made, the system will again check to determine whether the designated lending institution is satisfactory 120, and if not 121, the system will notify the customer via e-mail that the transaction will be prohibited 122. However, if satisfactory, 120, 123 or 116, 124, the customer is deemed to have a letter of credit that is sponsored by an approved lender.

At this point, the system determines whether the medical device selected for purchase is registered 125 so as to be in compliance with the requisite rules and regulations of the destination country, and if not 126, the customer is denied the purchase 127, again via e-mail or the local country representative are informed via e-mail to ensure steps are taken to register the product. If accepted, 125, 128, the customer is so notified 129. Further, at this point, all additional terms relating to the purchase are to be specified. For instance, the delivery terms such as date and time might be included. Additionally, all documents pertaining to the purchase are stored 130 according to the seller's retention policies and the product is shipped 132 to the purchaser. Customer installation site details are collected 134 to facilitate potential future interaction between the seller and customer, such as product servicing or compliance with appropriate regulations.

As a final check, the system determines whether the overseas bank remitting the payment for the desired products and/or services are on the exclusionary list or absent from the exclusionary list because of irregularities such as suspected money laundering. If not 137, the seller's counsel is notified 138 so as to determine whether a satisfactory resolution can be reached 139. If not, 140, the customer will receive e-mail 141 requesting payment by another means. If the overseas bank is approved for payment 136, 142, or if a satisfactory resolution to the problem of having an unapproved overseas bank is reached, 139, 143 (for example, selecting another overseas financial institution) the payment for the product ordered is accepted 144 and the process is then complete 146.

Although the present invention is readily applicable to electronic transactions between a customer and seller for medical devices and related services, it is readily apparent to those skilled in the art that the present invention is applicable to any transaction wherein both the product/service and customer must be screened before the requisite authorization to complete the transaction may take place.

The present invention has been described in terms of the preferred embodiment, and it is recognized that equivalents, alternatives, and modifications, aside from those expressly stated, are possible and within the scope of the appending claims.

We claim:

1. A method for designing an electronic transaction system comprising the steps of:
   (a) reviewing existing direct sales screening processes to ensure policy compliance;
   (b) creating new screening processes to minimize commercial risk in an electronic transaction;
   (c) integrating the existing direct sales screening processes and new screening processes;
   (d) determining and implementing legal terms and conditions for the electronic transactions;
   (e) forming electronic media for steps (a) through (d); and
   (f) posting the electronic media on a global communications network.

2. The method of claim 1 further comprising the steps of:
   reducing end user risks by reducing transaction variation and by establishing a global registration process;
   setting electronic commerce guidelines for site design managers;
   determining status of contractual jurisdictional compliance;
   developing region specific legal checklists and training to ensure compliance;
   developing regional resource reference pools using e-mail, public folders, and other electronic tools to disseminate information;
   designing add-on modules to ensure an enhanced end user experience;
   drafting agreements with exclusions to exclusive relationships;
   integrating with Phase Review Discipline (PRD) systems;
   tracking all new electronic commerce generated offers; and
   tracking product/service offerings online through customer surveys.

3. The method of claim 1 further comprising the steps of:
   selling medical devices for use by licensed end user;
   selling only to authorized distributors;
   complying with international trade control regulations;
   ensuring all transactions comply with internal anti-money laundering policies; and
   ensuring all transactions comply with applicable jurisdictional law on data protection.

4. The method of claim 1 further comprising the steps of:
   considering impact of applicable regulations on electronic sales transactions;
   creating regulation compliance procedures;
   implementing regulation compliance procedures;

integrating Order Through Remittance (OTR) processes with electronic order collection;

developing customer credit worthiness procedures;

ensuring customer credit worthiness procedures are implemented and followed;

ensuring review of all electronic transactions by key project personnel; and collecting payment electronically for delivery of medical device.

5. The method of claim 1 further comprising restricting sales in at least one product category to include: medical equipment and product/service information pertaining to medical equipment and services.

6. The method of claim 1 further comprising developing a supplier system with network of computers having a first tier computer system programmed to receive and ensure the completeness of the customer data, as well as a second tier computer system programmed to receive the customer data from the first system and ensure that the customer is an authorized purchaser of the desired product.

7. The method of claim 1 further comprising the step of developing a computer program on a computer readable medium which, when executed by one or more computers, causes the one or more computers to:

acquire customer information comprising an account number, if any, and a product order specifying a desired product from a customer at a user interface, so that the customer may access an automated seller facility having unrestricted and restricted product categories;

determine whether the desired product is in the restricted product category, and if so, then checking whether the user is an authorized buyer of such restricted product;

accept the product order if either the customer is an authorized buyer of products in the restricted products category or if the desired product is in the unrestricted product category, thereby indicating the customer and the product order have been accepted for purchasing the desired product, and if not, reject the product order.

8. The computer readable medium of claim 7 wherein the restricted product category can include at least one of: medical equipment and product/service information related to medical services and equipment; and wherein the product order is a purchase offer in which the customer offers to purchase the desired products, and wherein a contract is not formed until the offer to purchase is accepted by the automated seller facility after pre-specified conditions are satisfied.

9. The computer readable medium of claim 7 wherein the acquisition of customer information further includes a confirmation that each required field in the user interface has been completed, and if it has not, then customer access is restricted until all required fields are complete;

wherein the customer information further includes a method of payment, and if the customer and order have been authorized, then checking whether the method of payment is an authorized method of payment for that customer; and wherein the computer program stored thereon further causes the one or more computers to check whether the customer has changed the legal terms and conditions defined in the user interface of the product purchase offer, and if so, ensuring that such changes are satisfactory to the automated seller facility.

10. The computer readable medium of claim 7 wherein the computer program stored thereon further causes the one or more computers to create and send an offer declination if pre-specified conditions are not satisfied;

wherein the computer program stored thereon further causes the one or more computers to provide a pre-populated form in response to an account number entry by an existing customer requiring customer confirmation of data therein;

wherein the act of acceptance of the product order is further defined as requiring an assurance that the customer is not in a restricted location and that the desired product is not being shipped to a restricted location; and wherein the computer program stored thereon causes the one or more computers to further check whether the customer is one of a licensed purchaser of medical equipment and an authorized distributor of medical equipment, when checking whether the customer is an authorized buyer, and the restricted products are further defined to include medical equipment.

11. The method of claim 1 further comprising a method of forming a proposal for doing business on a global communications network comprising the steps of:

(a) determining available products/services;

(b) identifying types of possible transactions based on the available products/services;

(c) approaching a subject matter expert for a business modality to obtain subject matter data;

(d) preparing an electronic document template for each specific transaction to reduce transaction variation;

(e) creating a global communications network filter mechanism to minimize legal/regulatory risks; and (f) presenting a proposal based on steps (a)-(e) to a head of the business modality for approval.

12. The method of forming a proposal for doing business on a global communications network of claim 11 further comprising the steps of:

preparing a high-level process map;

considering impact of the high-level process map;

preparing electronic red flag checklists which follow the high-level process map;

contacting key personnel to answer queries;

contacting key personnel to provide background data;

approving site design and site contents prior to release; and releasing site for viewing by potential customers over a global communications network.

13. The method of forming a proposal for doing business on a global communications network of claim 11 further comprising the step of developing an electronic contract to allow a customer to purchase a desired product after accepting a purchase offer from the customer.

14. The method of claim 1 further comprising a method of conducting electronic commerce over a global network comprising the steps of:

proposing an interactive global communications network site;

preparing a list of product and service offerings to be made available through the interactive site;

creating content for the interactive site;

defining legal issues and legal issue impact before and after site rollout;

incorporating uniform global standard terms and conditions in an agreement for sale of products and services through the interactive site;

preparing an agreement with a financial institution to govern electronic payment for a product or service sold through the interactive site;

developing electronic commerce exclusion clauses for inclusion into traditional third party contracts;

approving the interactive site as ready for commerce; and posting the interactive site on a global network for use by potential customers.

15. The method of claim 14 further comprising the steps of:

before the posting step reducing end user risks by reducing transaction variation and by establishing a global registration process;

setting electronic commerce guidelines for site design managers;

determining status of contractual jurisdictional compliance;

developing region specific legal checklists and training to ensure compliance;

developing regional resource reference pools using e-mail, public folders, and other electronic tools to disseminate information;

after the posting step designing add-on modules to ensure an acceptable end user experience;

drafting agreements with exclusions to exclusive relationships;

integrating with PRD systems;

tracking all new electronic commerce generated offers; and tracking product/service offerings online through customer surveys.

16. The method of claim 14 further comprising the steps of:

selling medical devices for use by licensed end user;

selling only to authorized distributors;

complying with international trade control regulations;

ensuring all transactions comply with internal anti-money laundering policies; and ensuring all transactions comply with applicable jurisdictional law on data protection.

17. The method of claim 1 further comprising a method of electronic sale of medical devices comprising the steps of:

considering impact of regulatory regulations on electronic sales transactions;

creating regulation compliance procedures;

implementing regulation compliance procedures;

integrating OTR processes with electronic order collection;

developing customer credit worthiness procedures;

ensuring customer credit worthiness procedures are implemented and followed;

ensuring review of all electronic transactions by key project personnel; and collecting payment electronically for delivery of medical device.

18. The method of electronic sale of medical devices of claim 17 wherein the key project personnel may include one of the following: internal end users; regional business leaders; department heads; e-commerce business unit leaders; information technology personnel; sourcing personnel; finance personnel; marketing personnel; website managers; regional legal counsel; corporate information technology practice group personnel; compliance personnel; and tax specialists.

19. The method of electronic sale of medical devices of claim 17 further comprising the steps of:

teleconferencing key project personnel on a regular basis;

summarizing project milestones and action items via electronic mail; and reviewing of project periodically by key project personnel.

20. The method of electronic sale of medical devices of claim 17 further comprising the step of dividing business units geographically and allocating key project personnel by continent.

21. A system for initiating electronic sales of medical devices over a global communications network comprising:

a user interface configured to receive medical device sales requests having a plurality of parameters;

a database including a list of prohibited transaction criteria;

a filter mechanism configured to access the database and the review medical device sales requests to identify, from the plurality of parameters of the medical device sales requests, parameters matching prohibited transaction criteria; and a computer system configured to:

track the medical device sales requests;

determine legal terms and conditions to associate with the medical device sales requests;

review existing direct sales screening processes to determine whether the medical device sales requests and associated legal terms and conditions meet current policy compliance; and receive feedback from the filter mechanism to determine at least one of an acceptance or rejection of medical devices sales requests.

22. The system of claim 21 wherein the list of prohibited transaction criteria include at least one of transactions excluded according to franchise and third party sales agreements, transactions excluded according to regulatory licensing requirements for purchasers of medical devices, transactions excluded according to boycott screening policies, transactions excluded according to international trade control regulations, and transactions excluded according to international export policies.

23. The system of claim 21 wherein the computer system is further configured to track the medical device sales requests to match servicing requirements region specific resources to a geographical region of origin of the medical sales requests.

24. The system of claim 21 wherein the computer system is further configured to restrict sales in at least one product category including medical equipment and product/service information pertaining to medical equipment and services.

25. The system of claim 21 wherein the computer system is further configured to create and send an offer declination if feedback from the filter mechanism indicates a rejection of medical devices sales requests.

26. The system of claim 21 wherein the plurality of parameters include an indication of whether a customer is one of a licensed purchaser of medical equipment and an authorized distributor of medical equipment.

27. The system of claim 21 wherein the computer system is further configured to generate an electronic contract including the legal terms and conditions associated with the medical device sales requests to allow a customer to purchase a desired product after an acceptance of medical devices sales requests.

28. The system of claim 21 wherein the existing direct sales screening processes include at least one of existing PRD systems and existing OTR processes.

29. The system of claim 21 wherein the computer system is further configured to generate a customer survey to track product/service offerings online.

* * * * *